(12) United States Patent
Tsibulevskiy et al.

(10) Patent No.: US 10,311,134 B2
(45) Date of Patent: Jun. 4, 2019

(54) DATA PROCESSING SYSTEMS, DEVICES, AND METHODS FOR CONTENT ANALYSIS

(71) Applicants: Roman Tsibulevskiy, East Brunswick, NJ (US); Barry Greenbaum, Bergenfield, NJ (US)

(72) Inventors: Roman Tsibulevskiy, East Brunswick, NJ (US); Barry Greenbaum, Bergenfield, NJ (US)

( * ) Notice: Subject to any disclaimer, the term of this patent is extended or adjusted under 35 U.S.C. 154(b) by 0 days.

(21) Appl. No.: 15/047,814

(22) Filed: Feb. 19, 2016

(65) Prior Publication Data

US 2016/0170942 A1 Jun. 16, 2016

Related U.S. Application Data

(63) Continuation of application No. 14/979,395, filed on Dec. 27, 2015, now Pat. No. 9,508,027, which is a
(Continued)

(51) Int. Cl.
*G06K 9/00* (2006.01)
*G06F 17/22* (2006.01)
(Continued)

(52) U.S. Cl.
CPC ........ *G06F 17/2235* (2013.01); *G06F 16/248* (2019.01); *G06F 16/24553* (2019.01); *G06F 16/3344* (2019.01); *G06F 16/94* (2019.01); *G06F 17/241* (2013.01); *G06F 17/289* (2013.01); *G06K 9/00463* (2013.01); *G06K 9/00469* (2013.01); *G06K 9/18* (2013.01);
(Continued)

(58) Field of Classification Search
CPC . G06F 17/241; G06F 17/30014; G06K 9/222; G06K 9/000463
See application file for complete search history.

(56) References Cited

U.S. PATENT DOCUMENTS

| 4,504,972 A | 3/1985 | Scherl et al. |
| 5,073,953 A | 12/1991 | Westdijk |

(Continued)

FOREIGN PATENT DOCUMENTS

| CN | 102609606 A | 7/2012 |
| WO | WO2005048055 A2 | 5/2005 |

(Continued)

OTHER PUBLICATIONS

C Riedl et al., Detecting Figure and Part Labels in Patents: Competition-Based Development of Image Processing Algorithms, pp. 1-14 (2014).
(Continued)

*Primary Examiner* — Phuoc Tran

(57) ABSTRACT

Systems, devices and methods operative for identifying a reference within a figure and an identifier in a text associated with the figure, the reference referring to an element depicted in the figure, the reference corresponding to the identifier, the identifier identifying the element in the text, placing the identifier on the figure at a distance from the reference, the identifier visually associated with the reference upon the placing, the placing of the identifier on the figure is irrespective of the distance between the identifier and the reference.

20 Claims, 13 Drawing Sheets

Related U.S. Application Data continuation of application No. 13/623,251, filed on Sep. 20, 2012, now Pat. No. 9,223,769.

(60) Provisional application No. 61/633,523, filed on Feb. 13, 2012, provisional application No. 61/537,314, filed on Sep. 21, 2011.

(51) Int. Cl.

| | | |
|---|---|---|
| *G06F 16/93* | (2019.01) | |
| *G06F 16/248* | (2019.01) | |
| *G06F 16/33* | (2019.01) | |
| *G06F 16/2455* | (2019.01) | |
| *G06K 9/22* | (2006.01) | |
| *G06F 17/24* | (2006.01) | |
| *G06F 17/28* | (2006.01) | |
| *G06K 9/68* | (2006.01) | |
| *G06T 11/00* | (2006.01) | |
| *G06T 11/60* | (2006.01) | |
| *G06K 9/18* | (2006.01) | |

(52) U.S. Cl.
CPC ........... *G06K 9/222* (2013.01); *G06K 9/6814* (2013.01); *G06T 11/001* (2013.01); *G06T 11/60* (2013.01)

(56) References Cited

U.S. PATENT DOCUMENTS

| | | |
|---|---|---|
| 5,103,489 A | 4/1992 | Miette |
| 5,111,408 A | 5/1992 | Amjadi |
| 5,144,679 A | 9/1992 | Kakumoto et al. |
| 5,159,667 A | 10/1992 | Borrey et al. |
| 5,278,980 A | 1/1994 | Pedersen et al. |
| 5,321,770 A | 6/1994 | Huttenlocher et al. |
| 5,341,469 A | 8/1994 | Rossberg et al. |
| 5,369,714 A | 11/1994 | Withgott et al. |
| 5,508,084 A | 4/1996 | Reeves et al. |
| 5,514,860 A | 5/1996 | Berson |
| 5,579,414 A | 11/1996 | Fast et al. |
| 5,594,809 A | 1/1997 | Kopec et al. |
| 5,594,815 A | 1/1997 | Fast et al. |
| 5,594,817 A | 1/1997 | Fast et al. |
| 5,623,679 A | 4/1997 | Rivette et al. |
| 5,623,681 A | 4/1997 | Rivette et al. |
| 5,689,585 A | 11/1997 | Bloomberg et al. |
| 5,696,963 A | 12/1997 | Ahn |
| 5,713,016 A | 1/1998 | Hill |
| 5,721,763 A | 2/1998 | Joseph et al. |
| 5,726,736 A | 3/1998 | DeWolff et al. |
| 5,737,740 A | 4/1998 | Henderson et al. |
| 5,754,840 A | 5/1998 | Rivette et al. |
| 5,767,978 A | 6/1998 | Revankar et al. |
| 5,774,833 A | 6/1998 | Newman |
| 5,799,325 A | 8/1998 | Rivette et al. |
| 5,806,079 A | 9/1998 | Rivette et al. |
| 5,809,318 A | 9/1998 | Rivette et al. |
| 5,841,900 A | 11/1998 | Rahgozar et al. |
| 5,845,288 A | 12/1998 | Syeda-Mahmood |
| 5,845,300 A | 12/1998 | Comer et al. |
| 5,845,301 A | 12/1998 | Rivette et al. |
| 5,848,409 A | 12/1998 | Ahn |
| 5,850,474 A | 12/1998 | Fan et al. |
| 5,889,886 A | 3/1999 | Mahoney |
| 5,893,126 A | 4/1999 | Drews et al. |
| 5,895,473 A | 4/1999 | Williard et al. |
| 5,949,752 A | 9/1999 | Glynn et al. |
| 5,956,468 A | 9/1999 | Ancin |
| 5,982,931 A | 11/1999 | Ishimaru |
| 5,983,180 A | 11/1999 | Robinson |
| 5,991,751 A | 11/1999 | Rivette et al. |
| 5,991,780 A | 11/1999 | Rivette et al. |
| 5,995,659 A | 11/1999 | Chakraborty et al. |
| 5,999,907 A | 12/1999 | Donner |
| 6,002,798 A | 12/1999 | Palmer et al. |
| 6,008,817 A | 12/1999 | Gilmore, Jr. |
| 6,014,663 A | 1/2000 | Rivette et al. |
| 6,026,388 A | 2/2000 | Liddy et al. |
| 6,029,177 A | 2/2000 | Sadiq et al. |
| 6,038,561 A * | 3/2000 | Snyder ............. G06F 17/30011 |
| 6,049,811 A | 4/2000 | Petruzzi et al. |
| 6,056,428 A | 5/2000 | Devoino et al. |
| 6,058,398 A | 5/2000 | Lee |
| 6,065,026 A | 5/2000 | Cornelia et al. |
| 6,120,025 A | 9/2000 | Hughes, IV |
| 6,154,725 A | 11/2000 | Donner |
| 6,167,370 A | 12/2000 | Tsourikov et al. |
| 6,175,824 B1 | 1/2001 | Breitzman et al. |
| 6,189,002 B1 | 2/2001 | Roitblat |
| 6,195,459 B1 | 2/2001 | Zhu |
| 6,202,043 B1 | 3/2001 | Devoino et al. |
| 6,249,604 B1 | 6/2001 | Huttenlocher et al. |
| 6,263,314 B1 | 7/2001 | Donner |
| 6,289,341 B1 | 9/2001 | Barney |
| 6,321,236 B1 | 11/2001 | Zollinger et al. |
| 6,339,767 B1 | 1/2002 | Rivette et al. |
| 6,360,236 B1 | 3/2002 | Khan et al. |
| 6,377,965 B1 | 4/2002 | Hachamovitch et al. |
| 6,401,118 B1 | 6/2002 | Thomas |
| 6,422,974 B1 | 7/2002 | Schimmel |
| 6,434,580 B1 * | 8/2002 | Takano ................... G06F 17/21 704/9 |
| 6,462,778 B1 | 10/2002 | Abram et al. |
| 6,477,524 B1 | 11/2002 | Taskiran et al. |
| 6,499,026 B1 | 12/2002 | Rivette et al. |
| 6,516,097 B1 | 2/2003 | Pritt |
| 6,546,390 B1 | 4/2003 | Pollack et al. |
| 6,556,992 B1 | 4/2003 | Barney et al. |
| 6,560,590 B1 | 5/2003 | Shwe et al. |
| 6,565,610 B1 | 5/2003 | Wang et al. |
| 6,584,223 B1 | 6/2003 | Shiiyama |
| 6,594,393 B1 | 7/2003 | Minka et al. |
| 6,621,595 B1 | 9/2003 | Fan et al. |
| 6,623,529 B1 | 9/2003 | Lakritz |
| 6,628,285 B1 | 9/2003 | Abeyta et al. |
| 6,636,249 B1 | 10/2003 | Rekimoto |
| 6,662,178 B2 | 12/2003 | Lee |
| 6,665,656 B1 | 12/2003 | Carter |
| 6,694,331 B2 | 2/2004 | Lee |
| 6,724,369 B2 | 4/2004 | Slotta |
| 6,731,789 B1 | 5/2004 | Tojo |
| 6,738,518 B1 | 5/2004 | Minka et al. |
| 6,757,081 B1 | 6/2004 | Fan et al. |
| 6,766,069 B1 | 7/2004 | Dance et al. |
| 6,793,429 B2 | 9/2004 | Arrison |
| 6,799,718 B2 | 10/2004 | Chan et al. |
| 6,801,201 B2 | 10/2004 | Escher |
| 6,826,305 B2 | 11/2004 | Zhu |
| 6,836,883 B1 | 12/2004 | Abrams et al. |
| 6,845,486 B2 | 1/2005 | Yamada et al. |
| 6,879,990 B1 | 4/2005 | Boyer et al. |
| 6,959,280 B1 | 10/2005 | Risen, Jr. et al. |
| 6,970,860 B1 | 11/2005 | Liu et al. |
| 6,971,619 B2 | 12/2005 | Pearson |
| 6,980,680 B2 | 12/2005 | Batchelder et al. |
| 6,993,708 B1 | 1/2006 | Gillig |
| 6,996,295 B2 | 2/2006 | Tyan et al. |
| 6,996,575 B2 | 2/2006 | Cox et al. |
| 7,005,094 B2 | 2/2006 | Jack |
| 7,010,751 B2 | 3/2006 | Shneiderman |
| 7,013,433 B1 | 3/2006 | Schorr et al. |
| 7,024,408 B2 | 4/2006 | Dehlinger et al. |
| 7,047,255 B2 | 5/2006 | Imaichi et al. |
| 7,047,487 B1 | 5/2006 | Bates et al. |
| 7,051,277 B2 | 5/2006 | Kephart et al. |
| 7,082,427 B1 | 7/2006 | Seibel et al. |
| 7,086,028 B1 | 8/2006 | Davis et al. |
| 7,130,848 B2 | 10/2006 | Oosta |
| 7,139,755 B2 | 11/2006 | Hammond |
| 7,167,823 B2 | 1/2007 | Endo et al. |
| 7,246,104 B2 | 7/2007 | Stickler |
| 7,259,753 B2 | 8/2007 | Keely et al. |
| 7,296,015 B2 | 11/2007 | Poltorak |

(56) References Cited

U.S. PATENT DOCUMENTS

| | | | |
|---|---|---|---|
| 7,321,687 B2 | 1/2008 | Yamamoto |
| 7,333,984 B2 | 2/2008 | Oosta |
| 7,365,739 B2 | 4/2008 | Hiromori |
| 7,366,705 B2 | 4/2008 | Zeng et al. |
| 7,418,138 B2 | 8/2008 | Ahmed |
| 7,542,934 B2 | 6/2009 | Markel |
| 7,561,742 B2 | 7/2009 | Boose et al. |
| 7,581,168 B2 | 8/2009 | Boon |
| 7,587,061 B1 * | 9/2009 | Pacenti ............... G06K 9/00476 |
| | | 382/100 |
| 7,599,580 B2 | 10/2009 | King et al. |
| 7,599,867 B1 | 10/2009 | Monroe et al. |
| 7,606,757 B1 | 10/2009 | Poltorak |
| 7,613,626 B1 | 11/2009 | Muniganti et al. |
| 7,636,886 B2 | 12/2009 | Wyle et al. |
| 7,640,198 B1 | 12/2009 | Albanese et al. |
| 7,644,360 B2 | 1/2010 | Beretich, Jr. et al. |
| 7,672,022 B1 | 3/2010 | Fan |
| 7,680,686 B2 | 3/2010 | Tellefsen et al. |
| 7,685,042 B1 | 3/2010 | Monroe et al. |
| 7,711,676 B2 | 5/2010 | Stuhec |
| 7,730,061 B2 | 6/2010 | Gruhl et al. |
| 7,783,637 B2 | 8/2010 | Bitsch et al. |
| 7,792,728 B2 | 9/2010 | Poltorak |
| 7,792,832 B2 | 9/2010 | Poltorak |
| 7,801,909 B2 | 9/2010 | Poltorak |
| 7,818,342 B2 | 10/2010 | Stuhec |
| 7,835,966 B2 | 11/2010 | Satchwell |
| 7,844,487 B2 | 11/2010 | Chapman |
| 7,853,506 B2 | 12/2010 | Satchwell |
| 7,853,572 B2 | 12/2010 | Lundberg et al. |
| 7,864,365 B2 | 1/2011 | Campbell et al. |
| 7,865,519 B2 | 1/2011 | Stuhec |
| 7,876,959 B2 | 1/2011 | Matsuda et al. |
| 7,882,002 B2 | 2/2011 | Monroe et al. |
| 7,890,851 B1 | 2/2011 | Milton, Jr. |
| 7,894,677 B2 | 2/2011 | Konig et al. |
| 7,904,355 B1 | 3/2011 | Johnson |
| 7,904,453 B2 | 3/2011 | Poltorak |
| 7,912,792 B2 | 3/2011 | Lehrman et al. |
| 7,941,468 B2 | 5/2011 | Zellner et al. |
| 7,953,295 B2 | 5/2011 | Vincent |
| 7,958,067 B2 | 6/2011 | Schmidtler et al. |
| 7,970,213 B1 | 6/2011 | Ruzon et al. |
| 7,975,214 B2 | 7/2011 | Boegelund et al. |
| 7,979,358 B1 | 7/2011 | Clem et al. |
| 7,984,047 B2 | 7/2011 | Sukman |
| 8,015,492 B2 | 9/2011 | Reid |
| 8,031,940 B2 | 10/2011 | Vincent |
| 8,036,971 B2 | 10/2011 | Aymeloglu et al. |
| 8,098,934 B2 | 1/2012 | Vincent |
| 8,112,701 B2 | 2/2012 | Gur et al. |
| 8,136,050 B2 | 3/2012 | Sacher et al. |
| 8,141,036 B2 | 3/2012 | Wagner et al. |
| 8,160,306 B1 * | 4/2012 | Neustel ............... G06Q 10/10 |
| | | 345/556 |
| 8,171,049 B2 | 5/2012 | Ah-Pine et al. |
| 8,174,462 B2 | 5/2012 | Rosander et al. |
| 8,189,917 B2 | 5/2012 | Campbell |
| 8,200,487 B2 | 6/2012 | Peters et al. |
| 8,230,326 B2 | 7/2012 | Albornoz et al. |
| 8,237,745 B1 | 8/2012 | Cornell et al. |
| 8,239,301 B2 | 8/2012 | Monroe et al. |
| 8,291,386 B2 | 10/2012 | Daniel |
| 8,301,487 B2 | 10/2012 | Rapperport et al. |
| 8,312,067 B2 | 11/2012 | Elias et al. |
| 8,370,143 B1 | 2/2013 | Coker |
| 8,370,240 B2 | 2/2013 | Monroe et al. |
| 8,396,814 B1 | 3/2013 | Sundaram et al. |
| 8,412,598 B2 | 4/2013 | Early et al. |
| 8,429,601 B2 | 4/2013 | Andersen |
| 8,458,060 B2 | 6/2013 | Esary et al. |
| 8,463,679 B2 | 6/2013 | Kaplan et al. |
| 8,504,349 B2 | 8/2013 | Manu et al. |
| 8,539,346 B2 | 9/2013 | Albornoz et al. |
| 8,543,381 B2 | 9/2013 | Connor |
| 8,547,330 B2 | 10/2013 | Buck |
| 8,560,429 B2 | 10/2013 | Buck |
| 8,570,326 B2 | 10/2013 | Gorev |
| 8,606,671 B2 | 12/2013 | Lee et al. |
| 8,667,609 B2 | 3/2014 | Tan et al. |
| 8,670,617 B2 * | 3/2014 | Knoblock ........... G06K 9/00637 |
| | | 382/113 |
| 8,683,439 B2 | 3/2014 | Daniel |
| 8,705,863 B1 | 4/2014 | Trauba |
| 8,732,060 B2 | 5/2014 | Salomon et al. |
| 8,744,135 B2 | 6/2014 | Roman |
| 8,805,093 B2 | 8/2014 | Zuev et al. |
| 8,805,848 B2 | 8/2014 | Bhatia et al. |
| 8,806,324 B2 | 8/2014 | Theobald |
| 8,843,407 B2 | 9/2014 | Tan |
| 8,854,302 B2 | 10/2014 | Buck |
| 8,855,999 B1 | 10/2014 | Elliot |
| 8,875,093 B2 | 10/2014 | Balasubramanian et al. |
| 8,884,965 B2 | 11/2014 | Chuang et al. |
| 8,909,656 B2 | 12/2014 | Kumar et al. |
| 8,930,897 B2 | 1/2015 | Nassar |
| 8,938,686 B1 | 1/2015 | Erenrich et al. |
| 8,954,840 B2 | 2/2015 | Theobald |
| 9,015,671 B2 | 4/2015 | Johnson |
| 9,104,648 B2 | 8/2015 | Glasgow |
| 9,158,507 B2 | 10/2015 | Simonyi et al. |
| 9,176,944 B1 | 11/2015 | Coker |
| 9,183,561 B2 | 11/2015 | Hanumara et al. |
| 9,201,956 B2 | 12/2015 | Lundberg et al. |
| 9,229,966 B2 | 1/2016 | Aymeloglu et al. |
| 9,236,047 B2 | 1/2016 | Rasmussen |
| 2001/0027452 A1 | 10/2001 | Tropper |
| 2001/0027460 A1 | 10/2001 | Yamamoto et al. |
| 2001/0039490 A1 | 11/2001 | Verbitsky et al. |
| 2002/0007267 A1 | 1/2002 | Batchilo et al. |
| 2002/0016707 A1 | 2/2002 | Devoino et al. |
| 2002/0042784 A1 | 4/2002 | Kerven et al. |
| 2002/0062302 A1 | 5/2002 | Oosta |
| 2002/0077832 A1 | 6/2002 | Leonid et al. |
| 2002/0077835 A1 | 6/2002 | Hagelin |
| 2002/0077853 A1 | 6/2002 | Boru et al. |
| 2002/0077942 A1 | 6/2002 | Wilkinson |
| 2002/0083084 A1 | 6/2002 | Sugiyama |
| 2002/0095368 A1 | 7/2002 | Tran |
| 2002/0100016 A1 | 7/2002 | Van De Vanter et al. |
| 2002/0107896 A1 | 8/2002 | Ronai |
| 2002/0138297 A1 | 9/2002 | Lee |
| 2002/0138465 A1 | 9/2002 | Lee |
| 2002/0138473 A1 | 9/2002 | Whewell et al. |
| 2002/0138474 A1 | 9/2002 | Lee |
| 2002/0138475 A1 | 9/2002 | Lee |
| 2002/0141641 A1 | 10/2002 | Zhu |
| 2002/0147738 A1 | 10/2002 | Reader |
| 2002/0161464 A1 | 10/2002 | Weiner |
| 2002/0184130 A1 | 12/2002 | Blasko |
| 2003/0004988 A1 | 1/2003 | Hirasawa et al. |
| 2003/0007014 A1 | 1/2003 | Suppan et al. |
| 2003/0026459 A1 | 2/2003 | Won et al. |
| 2003/0028364 A1 | 2/2003 | Chan et al. |
| 2003/0030270 A1 | 2/2003 | Franko, Sr. et al. |
| 2003/0033270 A1 | 2/2003 | Budka et al. |
| 2003/0033295 A1 | 2/2003 | Adler et al. |
| 2003/0046307 A1 | 3/2003 | Rivette et al. |
| 2003/0065606 A1 | 4/2003 | Satchwell |
| 2003/0065607 A1 | 4/2003 | Satchwell |
| 2003/0065774 A1 | 4/2003 | Steiner et al. |
| 2003/0088573 A1 | 5/2003 | Stickler |
| 2003/0088581 A1 | 5/2003 | Maze et al. |
| 2003/0126128 A1 | 7/2003 | Watson |
| 2003/0130837 A1 | 7/2003 | Batchilo et al. |
| 2003/0187832 A1 | 10/2003 | Reader |
| 2003/0208459 A1 | 11/2003 | Shea et al. |
| 2003/0225749 A1 | 12/2003 | Cox et al. |
| 2004/0003013 A1 | 1/2004 | Coulthard et al. |
| 2004/0015481 A1 | 1/2004 | Zinda |
| 2004/0017579 A1 | 1/2004 | Lim |
| 2004/0021790 A1 | 2/2004 | Iga |
| 2004/0037473 A1 | 2/2004 | Ahmed et al. |

(56) References Cited

U.S. PATENT DOCUMENTS

| | | |
|---|---|---|
| 2004/0040011 A1 | 2/2004 | Bosworth et al. |
| 2004/0049498 A1 | 3/2004 | Dehlinger et al. |
| 2004/0056883 A1* | 3/2004 | Wierowski ............ G06F 3/0482 715/719 |
| 2004/0059994 A1 | 3/2004 | Fogel et al. |
| 2004/0078192 A1 | 4/2004 | Poltorak |
| 2004/0078365 A1 | 4/2004 | Poltorak |
| 2004/0088305 A1 | 5/2004 | Kintzley et al. |
| 2004/0088332 A1 | 5/2004 | Lee et al. |
| 2004/0098673 A1 | 5/2004 | Riddoch et al. |
| 2004/0133562 A1 | 7/2004 | Toong et al. |
| 2004/0158559 A1 | 8/2004 | Poltorak |
| 2004/0174546 A1 | 9/2004 | Guleryuz |
| 2004/0205540 A1 | 10/2004 | Vulpe et al. |
| 2004/0205599 A1 | 10/2004 | Whewell et al. |
| 2004/0220842 A1 | 11/2004 | Barney |
| 2004/0225592 A1 | 11/2004 | Churquina |
| 2004/0243566 A1 | 12/2004 | Ogram |
| 2004/0249824 A1 | 12/2004 | Brockway et al. |
| 2004/0261011 A1 | 12/2004 | Stuckman et al. |
| 2005/0005239 A1 | 1/2005 | Richards |
| 2005/0018057 A1 | 1/2005 | Bronstein et al. |
| 2005/0071367 A1 | 3/2005 | He et al. |
| 2005/0096999 A1 | 5/2005 | Newell et al. |
| 2005/0108652 A1 | 5/2005 | Beretich, Jr. et al. |
| 2005/0108682 A1 | 5/2005 | Piehler et al. |
| 2005/0114770 A1 | 5/2005 | Sacher et al. |
| 2005/0119995 A1 | 6/2005 | Lee |
| 2005/0149851 A1 | 7/2005 | Mittal |
| 2005/0165736 A1 | 7/2005 | Oosta |
| 2005/0177795 A1 | 8/2005 | Weiss et al. |
| 2005/0187949 A1 | 8/2005 | Rodenburg |
| 2005/0210009 A1* | 9/2005 | Tran ...................... G06Q 10/10 |
| 2005/0210382 A1 | 9/2005 | Cascini |
| 2005/0216828 A1 | 9/2005 | Brindisi |
| 2005/0234738 A1 | 10/2005 | Hodes |
| 2005/0243104 A1 | 11/2005 | Kinghorn |
| 2005/0256703 A1 | 11/2005 | Markel |
| 2005/0267831 A1 | 12/2005 | Esary et al. |
| 2005/0278227 A1 | 12/2005 | Esary et al. |
| 2005/0283337 A1 | 12/2005 | Sayal |
| 2006/0004861 A1 | 1/2006 | Albanese et al. |
| 2006/0026146 A1 | 2/2006 | Tvito |
| 2006/0031178 A1 | 2/2006 | Lehrman et al. |
| 2006/0031179 A1 | 2/2006 | Lehrman |
| 2006/0036542 A1 | 2/2006 | McNair |
| 2006/0047574 A1 | 3/2006 | Sundaram et al. |
| 2006/0059072 A1 | 3/2006 | Boglaev |
| 2006/0106746 A1 | 5/2006 | Stuhec |
| 2006/0106755 A1 | 5/2006 | Stuhec |
| 2006/0112332 A1 | 5/2006 | Kemp et al. |
| 2006/0136535 A1 | 6/2006 | Boon |
| 2006/0150079 A1 | 7/2006 | Albornoz et al. |
| 2006/0173699 A1 | 8/2006 | Boozer |
| 2006/0173920 A1 | 8/2006 | Adler et al. |
| 2006/0190805 A1 | 8/2006 | Lin |
| 2006/0198978 A1 | 9/2006 | Antonini |
| 2006/0221090 A1 | 10/2006 | Takeshima et al. |
| 2006/0230333 A1 | 10/2006 | Racovolis et al. |
| 2006/0248120 A1 | 11/2006 | Sukman |
| 2007/0001066 A1 | 1/2007 | Lane |
| 2007/0073625 A1 | 3/2007 | Shelton |
| 2007/0073653 A1 | 3/2007 | Raab |
| 2007/0078889 A1 | 4/2007 | Hoskinson |
| 2007/0136321 A1 | 6/2007 | Allen et al. |
| 2007/0198578 A1 | 8/2007 | Lundberg et al. |
| 2007/0208669 A1 | 9/2007 | Rivette et al. |
| 2007/0226250 A1 | 9/2007 | Mueller et al. |
| 2007/0255728 A1 | 11/2007 | Abate et al. |
| 2007/0291120 A1 | 12/2007 | Campbell et al. |
| 2007/0294192 A1 | 12/2007 | Tellefsen |
| 2008/0059280 A1 | 3/2008 | Tellefsen et al. |
| 2008/0126264 A1 | 5/2008 | Tellefsen et al. |
| 2008/0154848 A1 | 6/2008 | Haslam et al. |
| 2008/0183639 A1 | 7/2008 | DiSalvo |
| 2008/0183759 A1 | 7/2008 | Dehlinger |
| 2008/0189270 A1 | 8/2008 | Takimoto et al. |
| 2008/0195604 A1 | 8/2008 | Sears |
| 2008/0215354 A1 | 9/2008 | Halverson et al. |
| 2008/0216013 A1 | 9/2008 | Lundberg et al. |
| 2008/0222512 A1 | 9/2008 | Albornoz et al. |
| 2008/0243711 A1 | 10/2008 | Aymeloglu et al. |
| 2008/0256428 A1 | 10/2008 | Milton |
| 2008/0281860 A1 | 11/2008 | Elias et al. |
| 2008/0310723 A1 | 12/2008 | Manu et al. |
| 2008/0313560 A1 | 12/2008 | Dalal |
| 2009/0006327 A1 | 1/2009 | Pamp |
| 2009/0037804 A1 | 2/2009 | Theobald |
| 2009/0037805 A1 | 2/2009 | Theobald |
| 2009/0044090 A1 | 2/2009 | Gur et al. |
| 2009/0044091 A1 | 2/2009 | Gur et al. |
| 2009/0044094 A1 | 2/2009 | Rapp |
| 2009/0070738 A1 | 3/2009 | Johnson |
| 2009/0083055 A1 | 3/2009 | Tan |
| 2009/0086601 A1 | 4/2009 | McClellan et al. |
| 2009/0094016 A1 | 4/2009 | Mao |
| 2009/0138466 A1 | 5/2009 | Henry et al. |
| 2009/0138812 A1 | 5/2009 | Ikedo et al. |
| 2009/0144696 A1 | 6/2009 | Andersen |
| 2009/0157679 A1 | 6/2009 | Elias et al. |
| 2009/0192877 A1 | 7/2009 | Chapman |
| 2009/0210828 A1 | 8/2009 | Kahn |
| 2009/0228777 A1 | 9/2009 | Henry et al. |
| 2009/0259522 A1 | 10/2009 | Rapperport et al. |
| 2009/0259523 A1 | 10/2009 | Rapperport et al. |
| 2009/0276694 A1 | 11/2009 | Henry et al. |
| 2009/0327946 A1 | 12/2009 | Stignani et al. |
| 2010/0005094 A1 | 1/2010 | Poltorak |
| 2010/0050157 A1 | 2/2010 | Daniel |
| 2010/0050158 A1 | 2/2010 | Daniel |
| 2010/0070495 A1 | 3/2010 | Gruhl et al. |
| 2010/0080461 A1 | 4/2010 | Ferman |
| 2010/0088239 A1* | 4/2010 | Blair .................... G06F 17/227 705/80 |
| 2010/0106642 A1 | 4/2010 | Tan |
| 2010/0131427 A1 | 5/2010 | Monroe et al. |
| 2010/0191564 A1 | 7/2010 | Lee et al. |
| 2010/0241691 A1 | 9/2010 | Savitzky et al. |
| 2010/0250340 A1 | 9/2010 | Lee et al. |
| 2010/0262512 A1 | 10/2010 | Lee et al. |
| 2010/0262901 A1 | 10/2010 | DiSalvo |
| 2010/0293162 A1 | 11/2010 | Odland et al. |
| 2011/0016431 A1 | 1/2011 | Grosz et al. |
| 2011/0019915 A1 | 1/2011 | Roman |
| 2011/0035364 A1 | 2/2011 | Lipsey |
| 2011/0054884 A1 | 3/2011 | Drakwall et al. |
| 2011/0066644 A1 | 3/2011 | Cooper et al. |
| 2011/0087662 A1* | 4/2011 | Darby, Jr. ............. G06Q 10/06 707/736 |
| 2011/0091109 A1 | 4/2011 | Zuev et al. |
| 2011/0093373 A1 | 4/2011 | Monroe et al. |
| 2011/0109632 A1 | 5/2011 | Gorev |
| 2011/0137822 A1 | 6/2011 | Chapman |
| 2011/0138338 A1 | 6/2011 | Glasgow |
| 2011/0145120 A1 | 6/2011 | Lee et al. |
| 2011/0184726 A1 | 7/2011 | Connor |
| 2011/0188759 A1 | 8/2011 | Filimonova et al. |
| 2011/0196809 A1 | 8/2011 | Salomon et al. |
| 2011/0208610 A1 | 8/2011 | Halverson et al. |
| 2011/0225489 A1 | 9/2011 | Simonyi et al. |
| 2011/0231325 A1 | 9/2011 | Allen et al. |
| 2011/0238684 A1 | 9/2011 | Krause |
| 2011/0239151 A1 | 9/2011 | Allen et al. |
| 2011/0288863 A1 | 11/2011 | Rasmussen |
| 2011/0295893 A1 | 12/2011 | Wu |
| 2011/0307499 A1 | 12/2011 | Elias et al. |
| 2012/0076415 A1 | 3/2012 | Kahn |
| 2012/0109638 A1 | 5/2012 | Xiao et al. |
| 2012/0109813 A1 | 5/2012 | Buck |
| 2012/0144499 A1 | 6/2012 | Tan et al. |
| 2012/0176412 A1 | 7/2012 | Stuebe et al. |
| 2012/0191757 A1 | 7/2012 | Gross et al. |
| 2012/0216107 A1 | 8/2012 | Iwabuchi |
| 2012/0271748 A1 | 10/2012 | DiSalvo |

(56) References Cited

U.S. PATENT DOCUMENTS

| | | | |
|---|---|---|---|
| 2012/0278341 | A1 | 11/2012 | Ogilvy et al. |
| 2013/0144810 | A1 | 6/2013 | Simpson |
| 2013/0246435 | A1 | 9/2013 | Yan et al. |
| 2013/0246436 | A1 | 9/2013 | Levine |
| 2013/0318090 | A1 | 11/2013 | Bhatia et al. |
| 2014/0019329 | A1 | 1/2014 | Newell et al. |
| 2014/0195904 | A1 | 7/2014 | Chang et al. |
| 2014/0258927 | A1 | 9/2014 | Rana et al. |
| 2014/0358973 | A1 | 12/2014 | Roman |

FOREIGN PATENT DOCUMENTS

| | | | |
|---|---|---|---|
| WO | WO2006031952 | A2 | 3/2006 |
| WO | WO2011011002 | A1 | 1/2011 |
| WO | WO2013141886 | A1 | 9/2013 |
| WO | WO2015148410 | A1 | 10/2015 |

OTHER PUBLICATIONS

J Zhang and R Kasturi, Text detection using edge gradient and graph spectrum, ICPR, pp. 3979-3982 (2010).

Patentcafe, Advanced Technology Patent Search, Patent Analytics and Intellectual Property Management Solutions, <available at http://www.patentcafe.com, printed on Nov. 20, 2012>.

Neustel Software, Inc., PatentHunter, <available at http://www.patenthunter.com, printed on Nov. 20, 2012>.

United States Patent and Trademark Office, USPTO Partners with NASA's Center for Collaborative Innovation and TopCoder on Competition to Modernize Tools for Patent Examination <available at http://www.uspto.gov/news/pr/2012/12-19.jsp, printed on Nov. 20, 2012>.

White House, New Center for Excellence Fuels Prize to Help Modernize Tools for Patent Examination <http://www.whitehouse.gov/blog/2011/12/16/new-center-excellence-fuels- - prize-help-modernize-tools-patent-examination, printed on Nov. 20, 2012>.

Top Coder, Contest: USPTO Algorithm Challenge, Problem: Patent Labeling, <http://community.topcoder.com/longcontest/?module=ViewProblemStatemen-t&rd=15027&pm=11645, printed on Nov. 20, 2012>.

Top Coder, Contest: USPTO Algorithm Followup Challenge Problem: Patent Labeling2, <http://community.topcoder.com/longcontest/?module=ViewProblemStatemen-t&compid=24976&rd=15087, printed on Nov. 20, 2012>.

Top Coder, $10,000 USPTO Algorithm Challenge, <http://community.topcoder.com/ntl/?page.sub.--id=743, printed on Nov. 20, 2012>.

Cronje, Jaco, "Figure Detection and Part Label Extraction From Patent Drawing Images," Twenty-third Annual Symposium of the Pattern Recognition Association of South Africa, Nov. 29-30, 2012.

Vrochidis et al., "Towards content-based patent image retrieval: A framework perspective," World Patent Information, 2010, vol. 32, pp. 94-106.

Tiwari et al., "PATSEEK: Content Based Image Retrieval System for Patent Database," Proceedings of International Conference on Electronic Business, Beijing, China, 2004, pp. 1167-1171.

Huet et al., "Relational skeletons for retrieval in patent drawings," IEEE International Conference on Image Processing, 2001, vol. 2, pp. 737-740.

Zhiyuan et al., An Outward-Appearance Patent-Image Retrieval Approach Based on the Contour-Description Matrix, Frontier of Computer Science and Technology, Japan-China Joint Workshop, 2007, pp. 86-89.

Worring et al., "Content based hypertext creation in text/figure databases," Image Databases and Multimedia Search, Series on software engineering and knowledge engineering, 1997, vol. 8, pp. 87-96.

Li et al., "Graphics Image Processing System," Eighth IAPR International Workshop on Document Analysis Systems, 2008, pp. 455-462.

Li et al., "Associating figures with descriptions for patent documents," Ninth IAPR International Workshop on Document Analysis Systems, 2010, pp. 385-392.

Kang, Le et al. "Local Segmentation of Touching Characters using Contour based Shape Decomposition", Document Analysis Systems, 2012: 460-464.

Zhou, Shusen et al. "An Empirical Evaluation on Online Chinese Handwriting Databases", Document Analysis Systems 2012: 455-459.

Impedovo, Sebastiano et al. "A New Cursive Basic Word Database for Bank-Check Processing Systems", Document Analysis Systems 2012: 450-454.

Fang, Jing et al. "Dataset, Ground-Truth and Performance Metrics for Table Detection Evaluation", Document Analysis Systems 2012: 445-449.

Dendek, Piotr Jan et al. "Evaluation of Features for Author Name Disambiguation Using Linear Support Vector Machines", Document Analysis Systems 2012: 440-444.

Alves, N. F. et al. "A Strategy for Automatically Extracting References from PDF Documents", Document Analysis Systems 2012: 435-439.

Mazalov, V. et al. "Linear Compression of Digital Ink via Point Selection", Document Analysis Systems 2012: 429-434.

Anh Khoi Ngo Ho et al. "Panel and Speech Balloon Extraction from Comic Books", Document Analysis Systems 2012: 424-428.

Malik, M.I. et al. "A Signature Verification Framework for Digital Pen Applications", Document Analysis Systems 2012: 419-423.

Ramakrishnan, K. et al. "Learning Domain-Specific Feature Descriptors for Document Images", Document Analysis Systems 2012: 415-418.

Bart, E. "Parsing Tables by Probabilistic Modeling of Perceptual Cues", Document Analysis Systems 2012: 409-414.

Ui-Hasan, A. et al. "OCR-Free Table of Contents Detection in Urdu Books", Document Analysis Systems 2012: 404-408.

Chazalon, J. et al. "A Simple and Uniform Way to Introduce Complimentary Asynchronous Interaction Models in an Existing Document Analysis System", Document Analysis Systems 2012: 399-403.

Afzal, M.Z et al. "Improvements to Uncalibrated Feature-Based Stereo Matching for Document Images by Using Text-Line Line Segmentation", Document Analysis Systems 2012: 394-398.

Kumar, D. et al. "OTCYMIST: Otsu-Canny Minimal Spanning Tree for Born-Digital Images", Document Analysis Systems 2012: 389-393.

Quan Meng et al. "Text Detection in Natural Scenes with Salient Region", Document Analysis Systems 2012: 384-388.

Louloudis, G. et al. "Efficient Word Retrieval Using a Multiple Ranking Combination Scheme", Document Analysis Systems 2012: 379-383.

Philippot, E. et al. "Use of PGM for form recognition", Document Analysis Systems 2012: 374-379.

Chanda, S. et al. "Text Independent Writer Identification for Oriya Script", Document Analysis Systems 2012: 369-373.

Liwicki, M. et al. "Seamless Integration of Handwriting Recognition into Pen-Enabled Displays for Fast User Interaction", Document Analysis Systems 2012: 364-369.

Kitadai, A. et al. "Similarity Evaluation and Shape Feature Extraction for Character Pattern Retrieval to Support Reading Historical Documents", Document Analysis Systems 2012: 359-363.

Cong Kinh Nguyen et al. "Web Document Analysis Based on Visual Segmentation and Page Rendering", Document Analysis Systems 2012: 354-359.

Ahmed, S. et al. "Extraction of Text Touching Graphics Using SUR", Document Analysis Systems 2012: 349-353.

Truyen Van Phan et al. "Collecting Handwritten Nom Character Patterns from Historical Document Pages", Document Analysis Systems 2012: 344-349.

Ahmed, S. et al. "Automatic Room Detection and Room Labeling from Architectural Floor Plans", Document Analysis Systems 2012: 339-343.

Kobayashi, T. et al. "Recognizing Words in Scenes with a Head-Mounted Eye-Tracker", Document Analysis Systems 2012: 333-338.

(56) References Cited

OTHER PUBLICATIONS

Tsukada, M. et al. "Expanding Recognizable Distorted Characters Using Self-Corrective Recognition", Document Analysis Systems 2012: 327-332.
Porwal, U. et al. "Ensemble of Biased Learners for Offline Arabic Handwriting Recognition", Document Analysis Systems 2012: 322-326.
Shahab, A. et al. "How Salient is Scene Text?", Document Analysis Systems 2012: 317-321.
Ramaiah, C. et al. "Accent Detection in Handwriting Based on Writing Styles", Document Analysis Systems 2012: 312-316.
Papandreou, A. et al. "Word Slant Estimation Using Non-horizontal Character Parts and Core-Region Information", Document Analysis Systems 2012: 307-311.
Tianyi Gui et al. "A Fast Caption Detection Method for Low Quality Video Images", Document Analysis Systems 2012: 302-306.
Diem, Markus et al. "Skew Estimation of Sparsely Inscribed Document Fragments", Document Analysis Systems 2012: 292-301.
Xiaoyan Lin et al. "Performance Evaluation of Mathematical Formula Identification", Document Analysis Systems 2012: 287-291.
Pal, S. et al. "Off-Line Bangla Signature Verification", Document Analysis Systems 2012: 282-286.
Ohta, M. et al. "CRF-based Bibliography Extraction from Reference Strings Focusing on Various Token Granularities", Document Analysis Systems 2012: 276-281.
Xi Luo et al. "Impact of Word Segmentation Errors on Automatic Chinese Text Classification", Document Analysis Systems 2012: 271-275.
Wang Song et al. "Toward Part-Based Document Image Decoding", Document Analysis Systems 2012: 266-270.
Vu Nguyen et al. "A Compact Size Feature Set for the Off-Line Signature Verification Problem", Document Analysis Systems 2012: 261-265.
Mori, M. et al. "How Important is Global Structure for Characters?", Document Analysis Systems 2012: 255-260.
Smith, E.H.B. et al. "Effect of "Ground Truth" on Image Binarization", Document Analysis Systems 2012: 250-254.
Bloechle, J.-L. et al. "OCD Dolores—Recovering Logical Structures for Dummies", Document Analysis Systems 2012: 245-249.
Ghorbel, A. et al. "Optimization Analysis Based on a Breadth-First Exploration for a Structural Approach of Sketches Interpretation", Document Analysis Systems 2012: 240-244.
Chattopadhyay, T. et al. "On the Enhancement and Binarization of Mobile Captured Vehicle Identification Number for an Embedded Solution", Document Analysis Systems 2012: 235-239.
Matsushita, T. et al. "Effect of Text/Non-text Classification for Ink Search Employing String Recognition", Document Analysis Systems 2012: 230-234.
Takeda, K. et al. "Real-Time Document Image Retrieval on a Smartphone", Document Analysis Systems 2012: 225-229.
Pirlo, G. et al. "Voronoi-Based Zoning Design by Multi-objective Genetic Optimization", Document Analysis Systems 2012: 220-224.
Biswas, S. et al. "Writer Identification of Bangla Handwritings by Radon Transform Projection Profile", Document Analysis Systems 2012: 215-219.
Cunzhao Shi et al. "Graph-Based Background Suppression for Scene Text Detection", Document Analysis Systems 2012: 210-214.
Cutter, M.P. et al. "Capture and Dewarping of Page Spreads with a Handheld Compact 3D Camera", Document Analysis Systems 2012: 205-209.
Zhang, J. et al. "A Hybrid Network Intrusion Detection Technique Using Random Forests", in Proceedings of IEEE First International Conference on Availability, Reliability and Security (ARES'06) 2006.
Shahab, A. et al. "ICADAR 2011 robust reading competition challenge 2: Reading text in scene images", in Proc. Int. Conf. Document Analysis and Recognition (ICDAR'11) 2011: 1491-1496.
Casey, R. et al. "Strategies in character segmentation: a survey", IEEE Trans. Pattern Anal. Mach. Intell., vol. 18, No. 7 (1996): 690-706.
Zheng, Y. et al. "Machine printed text and handwriting identification in noisy document images", IEEE Trans. Pattern Anal. Mach. Intell., vol. 26, No. 3 (2004): 337-353.
Chou, P. A. et al. "Recognition of equations using a two-dimensional P. A. Chou, stochastic context-free grammar", in Visual Communications and Image Processing IV, ser. SPIE Proceedings Series, W. A. Pearlman, Ed., vol. 1199 (1989): 852-863.
Lu, T. et al. "A novel knowledge-based system for interpreting complex engineering drawings: Theory, representation, and implementation", IEEE Trans. Pattern Anal. Mach. Intell., vol. 31, No. 8 (2009): 1444-1457.
Lu, Z. "Detection of text regions from digital engineering drawings", IEEE Trans. Pattern Anal. Mach. Intell., vol. 20, No. 4 (1998): 431-439.
Zanibbi, R. et al. "A survey of table recognition", Document Analysis and Recognition, vol. 7, No. 1 (2004): 1-16.
Fletcher, L. et al. "A robust algorithm for text string separation from mixed text/graphics images", IEEE Trans. Pattern Anal. Mach. Intell., vol. 10, No. 6 (1988): 910-918.
Lai, C. et al. "Detection of dimension sets in engineering drawings", IEEE Trans. Pattern Anal. Mach. Intell., vol. 16, No. 8 (1994): 848-855.
Abbas, A. et al. "A literature review on the state-of-the-art in patent analysis", World Patent Information 2014: 1-11.
Caihong, J. et al. "Ontology-based Patent Abstracts' Knowledge Extraction", New Technology of Library and Information Service, 2 (2009):23-28, Abstract at: http://search.scirp.org/paper/1468741#.VctgJ.sub.--mzJBk (accessed on Aug. 12, 2015).
Matsuo, Y. et al. "Keyword Extraction from a Single Document using Word Co-occurrence Statistical Information", Proceedings of the Seventeenth International Florida Artificial Intelligence Research Society Conference, Miami, Florida, 2004: 392-396.
Fan, J. et al. "Automatic knowledge extraction from documents", IBM Journal of Research and Development, vol. 56, No. 314 (2012) 5:1-5:10.
Toussaint, G. T. "The use of context in pattern recognition", Pattern Recognition, vol. 10, No. 3 (1978): 189-204.
Basu, K. et al. "Recognition of Similar Shaped Handwritten Characters Using Logistic Regression", Document Anaysis Systems 2012: 200-204.
Bhowmik, T.K. et al. "Lexicon Reduction Technique for Bangle Handwritten Word Recognition", Dociment Analysis Systems 2012: 195-199.
Shirai, K. et al. "Removal of Background Patterns and Signitures for Magnetic Ink Character Recognition of Checks", Document Analysis Systems 2012: 190-194.
Shiraishi, S. et al. "A Part-Based Skew Estimation Method", Document Analysis Systems 2012: 185-189.
Richarz, J. et al. "Towards Semi-supervised Transcription of Handwritten Historial Weather Reports", Document Analysis Systems 2012; 180-184.
Ferrer, M.A. et al. "Is It Possible to Automatically Identify Who Has Forged My Signature? Approaching to the Identification of a Static Signature Forger", Document Analysis Systems 2012: 175-179.
Shaus, A. et al. "Quality Evaluation of Facsimiles of Hebrew First Temple Period Inscriptions", Document Analysis Systems 2012: 170-174.
Boumaiza, A. et al. "Symbol Recognition Using a Galois Lattice of Frequent Graphical Patterns", Document Analysis Systems 2012: 165-169.
Baolan Su et al. "An Effective Staff Detection and Removal Technique for Musical Documents", Document Analysis Systems 2012: 160-164.
Aguilar, F.D.J. et al. "ExpressMatch: A System for Creating Ground-Truthed Datasets of Online Mathematical Expressions", Document Analysis Systems 2012: 155-159.
Roy, P.P. et al. "An Efficient Coarse-to-Fine Indexing Technique for Fast Text Retrieval in Historical Documents", Document Analysis Systems 2012: 150-154.

(56) References Cited

OTHER PUBLICATIONS

Fiel, S. et al. "Writer Retrieval and Writer Identification Using Local Features", Document Analysis Systems 2012: 145-149.
Weihan Sun et al. "Similar Fragment Retrieval of Animations by a Bag-of-Features Approach", Document Analysis Systems 2012: 140-144.
Jain, R. et al. "Logo Retrieval in Document Images", Document Analysis Systems 2012: 135-139.
Dutta, S. et al. "Robust Recognition of Degraded Documents Using Character N-Grams", Document Analysis Systems 2012: 130-134.
Aiquan Yuan et al. "Offline handwritten English character recognition based on convolutional neural network", Document Analysis Systems 2012: 125-129.
Elagouni, K. et al. "Combining Multi-scale Character Recognition and Linguistic Knowledge for Natural Scene Text OCR", Document Analysis Systems 2012: 120-124.
Dar-Shyang Lee et al. "Improving Book OCR by Adaptive Language and Image Models", Document Analysis Systems 2012: 115-119.
Qiu-Feng Wang et al. "Improving Handwritten Chinese Text Recognition by Unsupervised Language Model Adaptation", Document Analysis Systems 2012: 110-114.
Rashid, S.F. et al. "Scanning Neural Network for Text Line Recognition", Document Analysis Systems 2012: 105-109.
Khayyat, M. et al. "Arabic Handwritten Text Line Extraction by Applying an Adaptive Mask to Morphological Dilation", Document Analysis Systems 2012: 100-104.
Garz, A. et al. "Binarization-Free Text Line Segmentation for Historical Documents Based on Interest Point Clustering", Document Analysis Systems 2012: 95-99.
Wei Fan et al. "Local Consistency Constrained Adaptive Neighbor Embedding for Text Image Super-Resolution", Document Analysis Systems 2012: 90-94.
Messaoud, I.B. et al. "Document Preprocessing System—Automatic Selection of Binarization", Document Analysis Systems 2012: 85-89.
The-Anh Pham et al. "A Robust Approach for Local Interest Point Detection in Line-Drawing Images", Document Analysis Systems 2012: 79-84.
Sharma, N. et al. "A New Method for Arbitrarily-Oriented Text Detection in Video", Document Analysis Systems 2012: 74-78.
Bo Bai et al. "A Fast Stroke-Based Method for Text Detection in Video", Document Analysis Systems 2012: 69-73.
Sharma, N. et al. "Recent Advances in Video Based Document Processing: A Review", Document Analysis Systems 2012: 63-68.
Cunzhao Shi et al. "Adaptive Graph Cut Based Binarization of Video Text Images", Document Analysis Systems 2012: 58-62.
Dong Liu et al. "A Prototype System of Courtesy Amount Recognition for Chinese Bank Checks", Document Analysis Systems 2012: 53-57.
Yalniz, I.Z. et al. "An Efficient Framework for Searching Text in Noisy Document Images", Document Analysis Systems 2012: 48-52.
Busagala, L.S.P. et al. "Multiple Feature-Classifier Combination in Automated Text Classification", Document Analysis Systems 2012: 43-47.
Zhao, D. et al. "New Spatial-Gradient-Features for Video Script Identification", Document Analysis Systems 2012: 38-42.
Gordo, A. et al. "Document Classification Using Multiple Views", Document Analysis Systems 2012: 33-37.
Lamiroy, B. et al. "The Non-geek's Guide to the DAE Platform", Document Analysis Systems 2012: 27-32.
Stamm, K. et al. "Attentive Tasks: Process-Driven Document Analysis for Multichannel Documents", Document Analysis Systems 2012: 22-26.
Liwicki, M. et al. "Koios++: A Query-Answering System for Handwritten Input", Document Analysis Systems 2012: 17-21.
Tkaczyk, D. et al. "A Modular Metadata Extraction System for Born-Digital Articles", Document Analysis Systems 2012: 11-16.
Forcher, B. et al. "Towards Understandable Explanations for Document Analysis Systems", Document Analysis Systems 2012: 6-10.
Lopresti, D. et al. "Adapting the Turing Test for Declaring Document Analysis Problems Solved", Document Analysis Systems 2012: 1-5.
Vrochidis, S. et al. "Concept-based patent image retrieval", World Patent Information 34 (2012): 292-303.
Fang, C. "Deciphering Algorithms for Degraded Document Recognition," PhD dissertation, State Univ. of New York at Buffalo 1997: 1-211.
Nagy, G. et al. "Optical character recognition: An illustrated guide to the frontier", Procs. Document Recognition and Retrieval VII, SPIE vol. 3967 (2000): 58-69.
Nagy, G. "Twenty years of document image analysis in PAMI", IEEE Trans. Pattern Anal. Mach. Intell., vol. 22, No. 1, (2000): 58-69.
Tassey, G. et al. "Economic impact assessment of NIST's text REtrieval conference (TREC) program", National Institute of Standards and Technology, Gaithersburg, Maryland 2010.
Smith, R. "An overview of the tesseract OCR engine", in Proc. Int. Conf. Document Analysis and Recognition, vol. 2, Curitiba, Brazil 2007: 629-633.
Russell, B.C. et al. "LabelMe: a database and web-based tool for image annotation", Int. J. Computer Vision, vol. 77, No. 1-3, (2008): 157-173.
Rice, S.V. et al. "The fifth annual test of OCR accuracy", Information Science Research Institute 1996: 1-44.
Gobeill, J. et al. "Report on the TREC 2009 experiments: Chemical IR track", in Text Retrieval Conf. 2009.
Bosch, A. et al. "Image classification using random forests and ferns", in ICCV 2007:1-8.
Carreras, X. et al. "Hierarchical Recognition of Propositional Arguments with Perceptrons", In Proceedings of CoNLL-2004 Shared Task 2004.
Csurka, G. et al. "XRCE's Participation at Patent Image Classification and Image-based Patent Retrieval Tasks of the Clef-IP 2011" in: Proceedings of CLEF 2011, Amsterdam 2011.
Couasnon, B. "DMOS, a generic document recognition method: application to table structure analysis in a general and in a specific way", Int. J. Document Analysis and Recognition, vol. 8, No. 2-3 (2006): 111-122.
Do, T-H. et al. "Text/graphic separation using a sparse representation with multi-learned dictionaries", in Int. Conf. Pattern Recognition, Tsukuba, Japan 2012: 689-692.
Gold, E. "Language identification in the limit", Information and Control, vol. 10 (1967): 447-474.
Zanibbi, R. et al. "Historical recall and precision: summarizing generated hypotheses", in Proc. Int. Conf. Document Analysis and Recognition, Seoul, South Korea, vol. 1 (2005): 202-206.
Coates, A. et al. "Text detection and character recognition in scene images with unsupervised feature learning", in Document Analysis and Recognition (ICDAR), 2011 International Conference (2011): 440-445.
Tiwari, A. et al. "PATSEEK: Content Based Image Retrieval System for Patent Database", in Proceedings International Conference on Electronic Business, Beijing, China 2004.
Meng, L. et al. "Research of Semantic Role Labeling and Application in Patent knowledge Extraction", Proceedings of the First International Workshop on Patent Mining and Its Applications (IPAMIN) 2014, Hildesheim 2014.
Kanungo, T. et al. "Understanding engineering drawings: A survey", in Proc. Work. Graphics Recognition 1995: 217-228.
Kavukcuoglu, K. et al. "Learning convolutional feature hierarchies for visual recognition", Advances in Neural Information Processing Systems 2010: 1090-1098.
Liang, J. et al. "Camera-based analysis of text and documents: A survey", Int. J. Document Analysis and Recognition, vol. 7, No. 2-3 (2005): 84-104.
Chawla, N. et al. "SMOTE: Synthetic Minority Over-Sampling Technique", Journal of Artificial Intelligence Research 16 (2002): 321-357.
Dori, D. et al. "Automated CAD conversion with the machine drawing understanding system: concepts, algorithms, and performance", IEEE Trans. Syst., Man, Cybern. A, vol. 29, No. 4 (1999): 411-416.

(56) References Cited

OTHER PUBLICATIONS

Pradhan, S. et al. "Support Vector Learning for Semantic Argument Classification", Machine Learning Journal. 60, 1/3 (2005): 11-39.
Wu, V. "Textfinder: an automatic system to detect and recognize text in images", IEEE Trans. Pattern Anal. Mach. Intell., vol. 21, No. 11 (1999): 1224-1229.
Moosmann F. et al. "Randomized clustering forests for image classification", IEEE Transactions on PAMI, 30(9) (2008): 1632-1646.
Gao, M. et al. "A combined SMOTE and PSO based RBF classifier for two-class imbalanced problems", Neurocomputing 74 (2011): 3456-3466.
Coates, A. et al. "An analysis of single-layer networks in unsupervised feature learning", in Proceedings of the International Conference on Artificial Intelligence and Statistics (AISTATS) 2011: 215-223.
Karaoglu, S. et al. "Object Reading: Text Recognition for Object Recognition", ECCV Workshops 3 (2012): 456-465.
Handley, J. et al. "Document understanding system using stochastic context-free grammars", in Proc. Int. Conf. Document Analysis and Recognition, Seoul, South Korea 2005: 511-515.
Palmer, M. et al. "The Proposition Bank: An annotated corpus of semantic roles", Computational Linguistics 31, 1 (2004): 71-105.
Chawla, N. et al. "SMOTEBoost: Improving prediction of the minority class in boosting", in 7th European Conference on Principles and Practice of Knowledge Discovery in Databases 2003: 107-119.
Pradhan, S. et al. "Semantic Role Labeling Using Different Syntactic Views", Association for Computational Linguistics Annual Meeting, Ann Arbor, Michigan 2005: 581-588.
Zhou, W. et al. "Principal visual word discovery for automatic license plate detection", IEEE Trans. Image Process., vol. 21, No. 9 (2012): 4269-4279.
Koomen, P. et al. "Generalized Inference with Multiple Semantic Role Labeling Systems", Proceedings of CoNLL-2005 Ann Arbor, Michigan 2005: 181-184.
Breiman, L. "Random Forests", in Machine Learning, 45(1) 2001: 5-32.
Karatzas, D. et al. "ICDAR 2011 robust reading competition-challenge 1: reading text in born-digital images (web and email)", in Proc. Int. Conf. Document Analysis and Recognition (ICDAR'11) 2011: 1485-1490.
Niemeijer, M. et al. "Retinopathy online challenge: automatic detection of microaneurysms in digital color fundus photographs", IEEE Trans. Med. Imag., vol. 29, No. 1 (2010): 185-195.
Roller, S. et al. "A multimodal LDA model integrating textual, cognitive and visual modalities", in Proceedings of the 2013 Joint Conference on Empirical Methods in Natural Language Processing and Computational Natural Language Learning, Seattle, Washington 2013: 1146-1157.
Zanibbi, R. et al. "Decision-based specification and comparison of table recognition algorithms", in Machine Learning in Document Analysis and Recognition, Berlin, Germany: Springer 2008: 71-103.
Terwiesch, C. et al. "Innovation Tournaments: Creating and Selecting Exceptional Opportunities", Boston, MA: Harvard Business Press, 2009.
Epshtein, B. et al. "Detecting text in natural scenes with stroke width transform", in IEEE Conf. Computer Vision and Pattern Recognition 2010: 2963-2970.
Jung, K. et al. "Text information extraction in images and video: a survey", Pattern Recognition, vol. 37, No. 5 (2004): 977-997.

Tombre, K. et al. "Text/graphics separation revisited", in Document Analysis Systems, ser. Lecture Notes in Computer Science, Lopresti, D.P. et al. Eds., vol. 2423. Springer 2002: 200-211.
Viola P. et al. "Rapid object detection using a boosted cascade of simple features", in Proc. of CVPR 2001, vol. 1 (2001): 511-518.
Breiman, L. "Manual—Setting up, using and understanding random forests V4.0", 2003: 1-33.
Nielsen, R.D., et al. "Mixing Weak Learners in Semantic Parsing", 42nd Annual Meeting of the Association for Computational Linguistics, Barcelona, Spain 2004: 1-8.
Wagner, R. et al. "The String-to-String Correction Problem", ACM, vol. 21, No. 1 (1974): 168-173.
Archak N. "Money, glory and cheap talk: analyzing strategic behavior of contestants in simultaneous crowdsourcing contests on topcoder.com", in Proc. Int. Conf. World Wide Web (WWW'10) 2010: 21-30.
Chan, K.F. et al. "Error detection, error correction and performance evaluation in on-line mathematical expression recognition", Pattern Recognition, vol. 34, No. 8 (2001): 1671-1684.
Schapire, R.E. et al. "Improved Boosting Algorithms Using Confidence-rated Predictions", Proceedings of the Eleventh annual conference on Computational learning theory, Madison, Wisonsin 1998: 80-91.
Wang, J. et al. "Classification of imbalanced data by using the SMOTE algorithm and locally linear embedding", in 8th International Conference on Signal Processing, 3 (2006):16-20.
Wu, V. et al. "Textfinder: an automatic system to detect and recognize text in images", IEEE Trans. Pattern Anal. Mach. Intell., vol. 21, No. 11 (1999): 1224-1229.
Sidiropoulos, P. et al. "Content-based binary image retrieval using the adaptive hierarchical density histogram", Pattern Recognition Journal, 44(4) 2011: 739-750.
Vrochidis, S. et al. "Towards Content-based Patent Image Retrieval; A Framework Perspective", World Patent Information Journal, 32(2) 2010: 94-106.
Wang, H-Y. "Combination approach of SMOTE and biased-SVM for imbalanced datasets", Proc. of the IEEE Int. Joint Conf. on Neural Networks, IJCNN 2008, Hong Kong (PRC) 2008: 22-31.
Xu, B. et al. "An improved random forest classifier for image classification", in Information and Automation (ICIA), 2012 International Conference on IEEE 2012: 795-800.
Alvestrand, H. "Tags for the Identification of Languages". Network Working Group Request for Comments: 3066. Jan. 2001. Retrieved from http://www.ietf.org/rfc/rfc3066.txt on Feb. 21, 2016.
Oracle. "JSR-000175 A Metadata Facility for the Java TM Programming Language" Dec. 5, 2003. Oracle. Downloaded from http://jcp.org/aboutJava/communityprocess/review/jsr175/index.html on Feb. 21, 2016.
W3C, Dave Raggett, Arnaud Le Hors, and Ian Jacobs, editors. "HTML 4.01 Specification," Dec. 24, 1999. W3C. Retrieved from https://www.w3.org/TR/html4/on Feb. 21, 2016.
TeamPatent—Secure Patent R&D Workspace, <http://www.teampatent.com/index.html, printed on Feb. 28, 2017>.
EDYT, <http://www.edyt.com/, printed on Feb. 28, 2017>.
LexisNexis, LexisNexis® PatentOptimizer™ Quick Reference Card, 54 pages, Aug. 13, 2010, retrieved from https://law.lexisnexis.com/literature/patentoptimizerquickreference.pdf on Oct. 25, 2017.
Paula J. Hane, LexisNexis Adds TotalPatent to Its Suite of Solutions, 6 pages, Sep. 17, 2007, retrieved from http://newsbreaks.infotoday.com/NewsBreaks/LexisNexis-Adds-TotalPatent-to-Its-Suite-of-Solutions-39623.asp on Oct. 25, 2017.

\* cited by examiner

FIG. 1       100
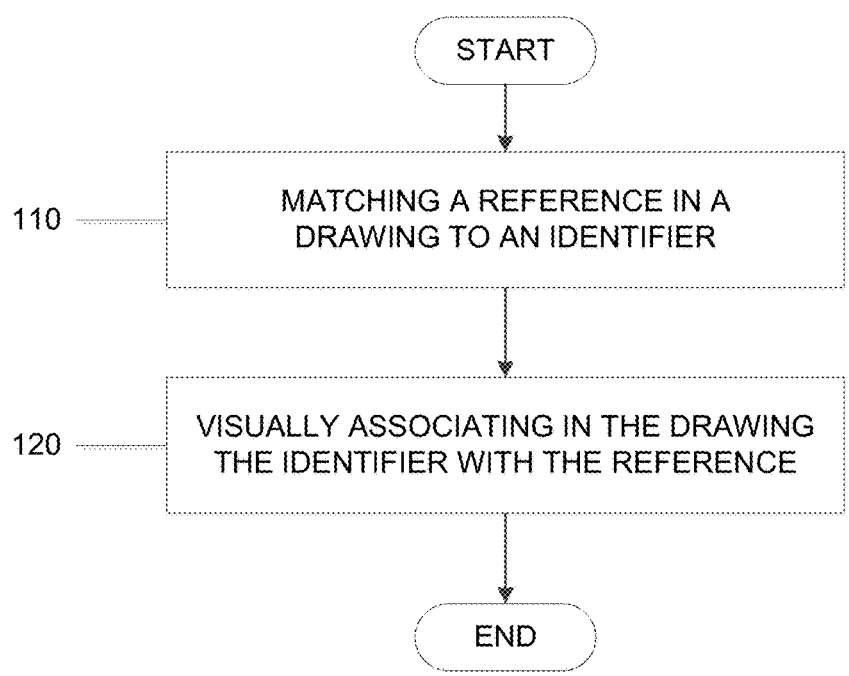

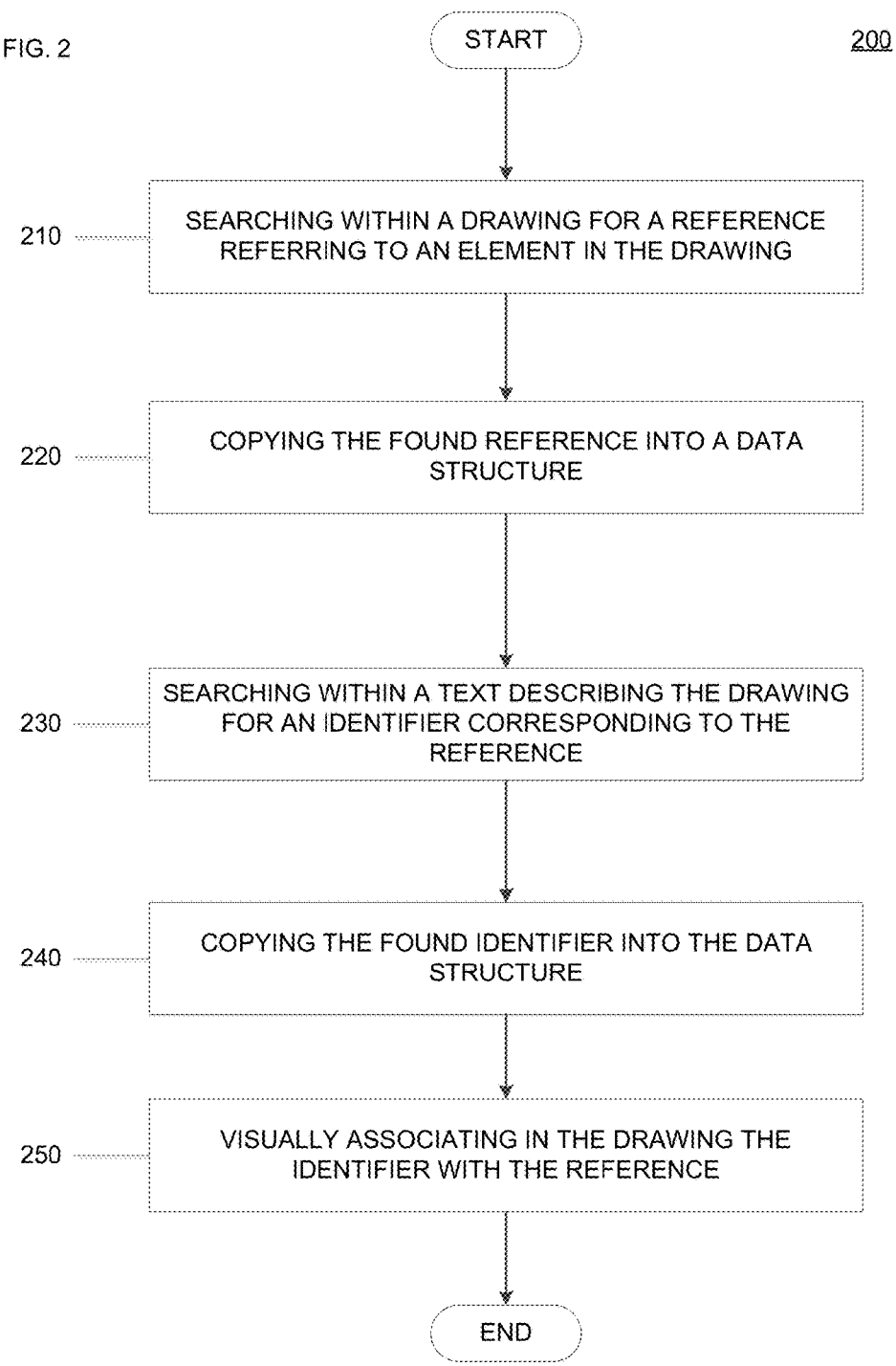

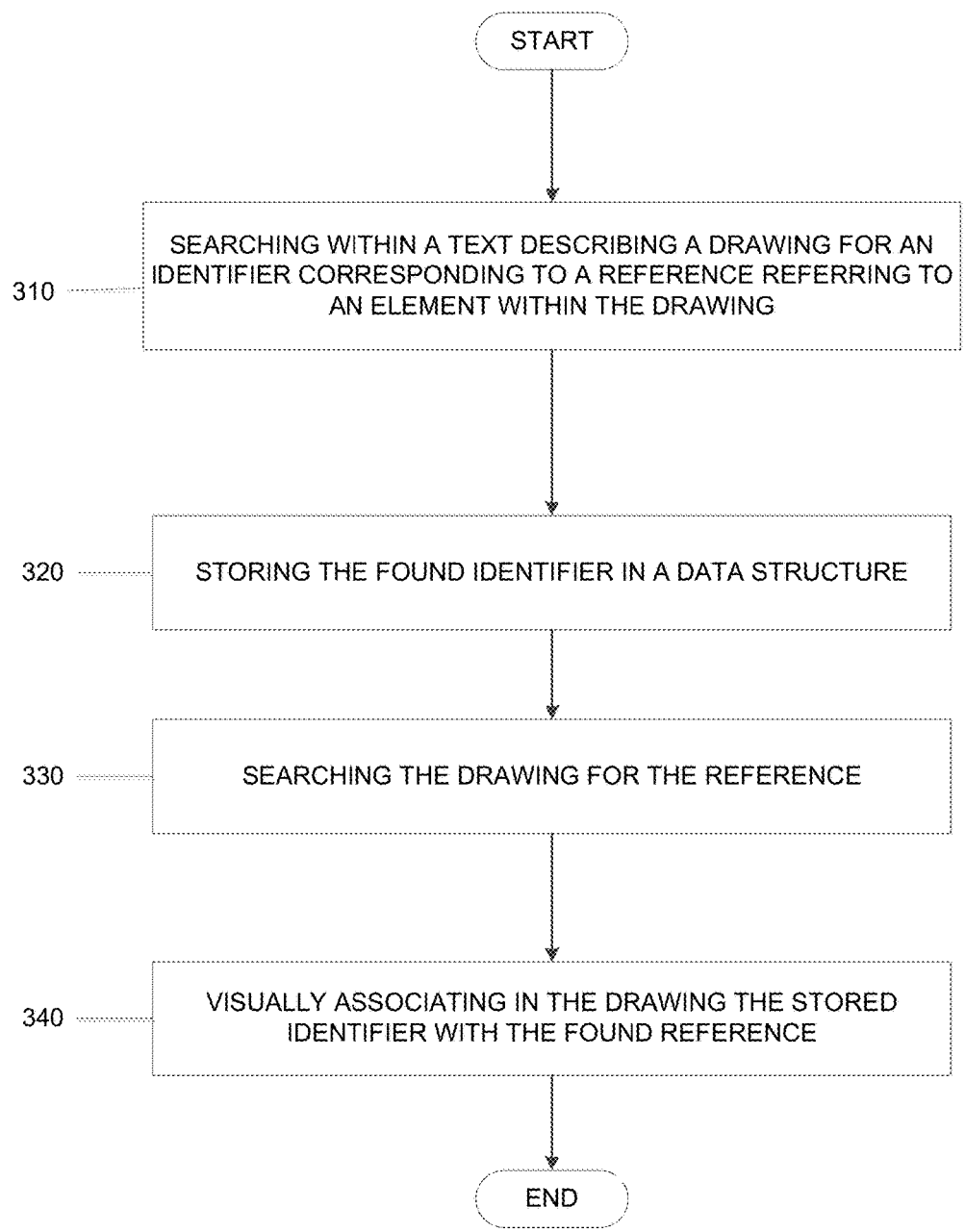

[0078] Shown in Fig. 31 is a diagram of a memory. Memory can be random access memory or read-only memory.

[0079] Shown in Fig. 32 is a central processing unit (CPU) 20 coupled to a first database 10 and a second database 30. CPU 20 is a single or a multicore processor. First database 10 and second database 30 store data executable by CPU 20.

[0080] Shown in Fig. 33 is an input device.

FIG. 4C

| Reference | Identifier |
|---|---|
| 10 | First database |
| 20 | CPU |
| 30 | Second database |

FIG. 4D

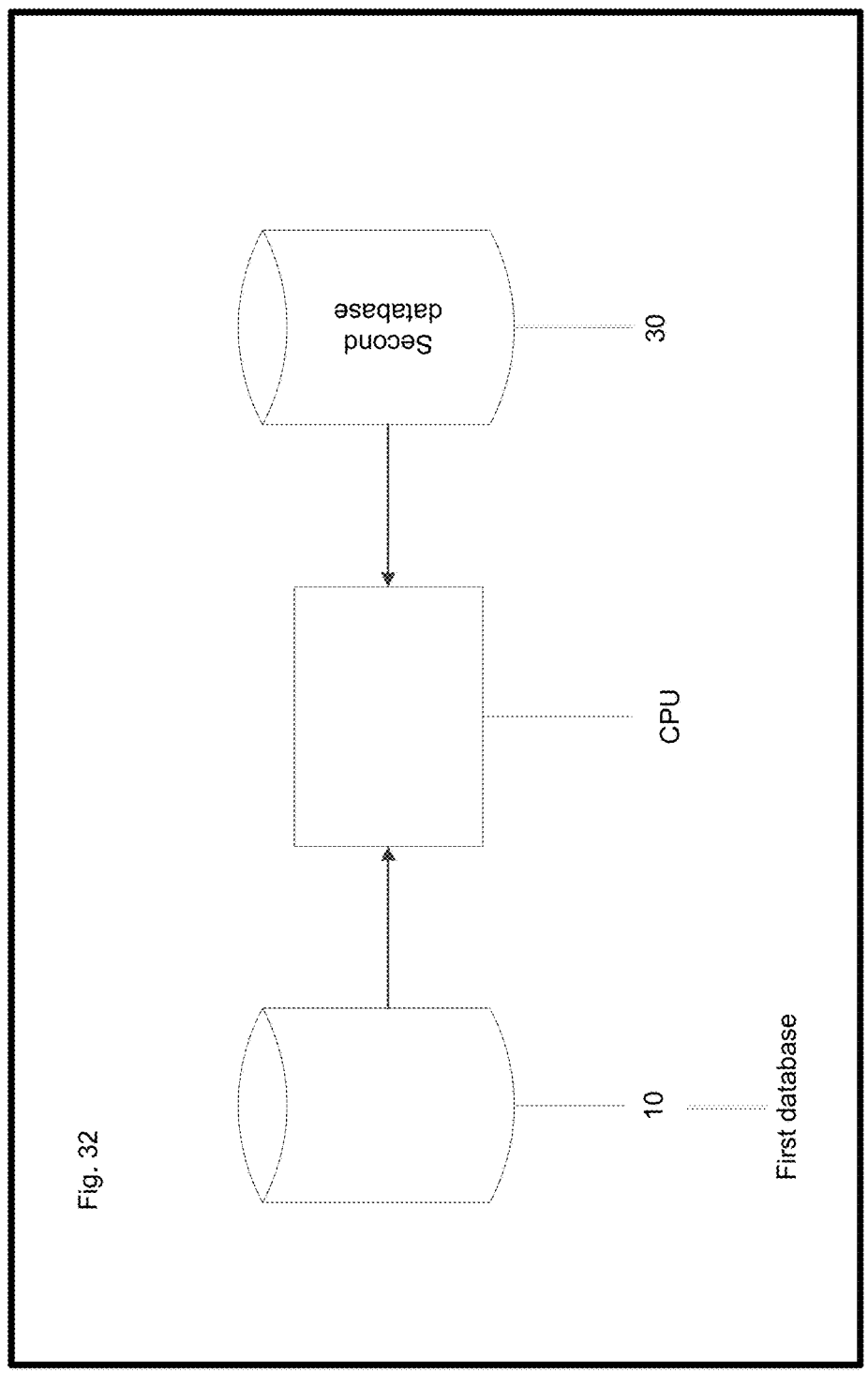

[0078] Shown in Fig. 31 is a diagram of a memory. Memory can be random access memory or read-only memory.

[0079] Shown in Fig. 32 is a central processing unit (CPU) 20 coupled to a first database 10 and a second database 30. CPU 20 is a single or a multicore processor. First database 10 and second database 30 store data executable by CPU 20.

[0080] Shown in Fig. 33 is an input device.

FIG. 5A

| Reference | Identifier |
|-----------|------------|
| 10 | First database |
| 20 | CPU |
| 30 | Second database |

FIG. 5B

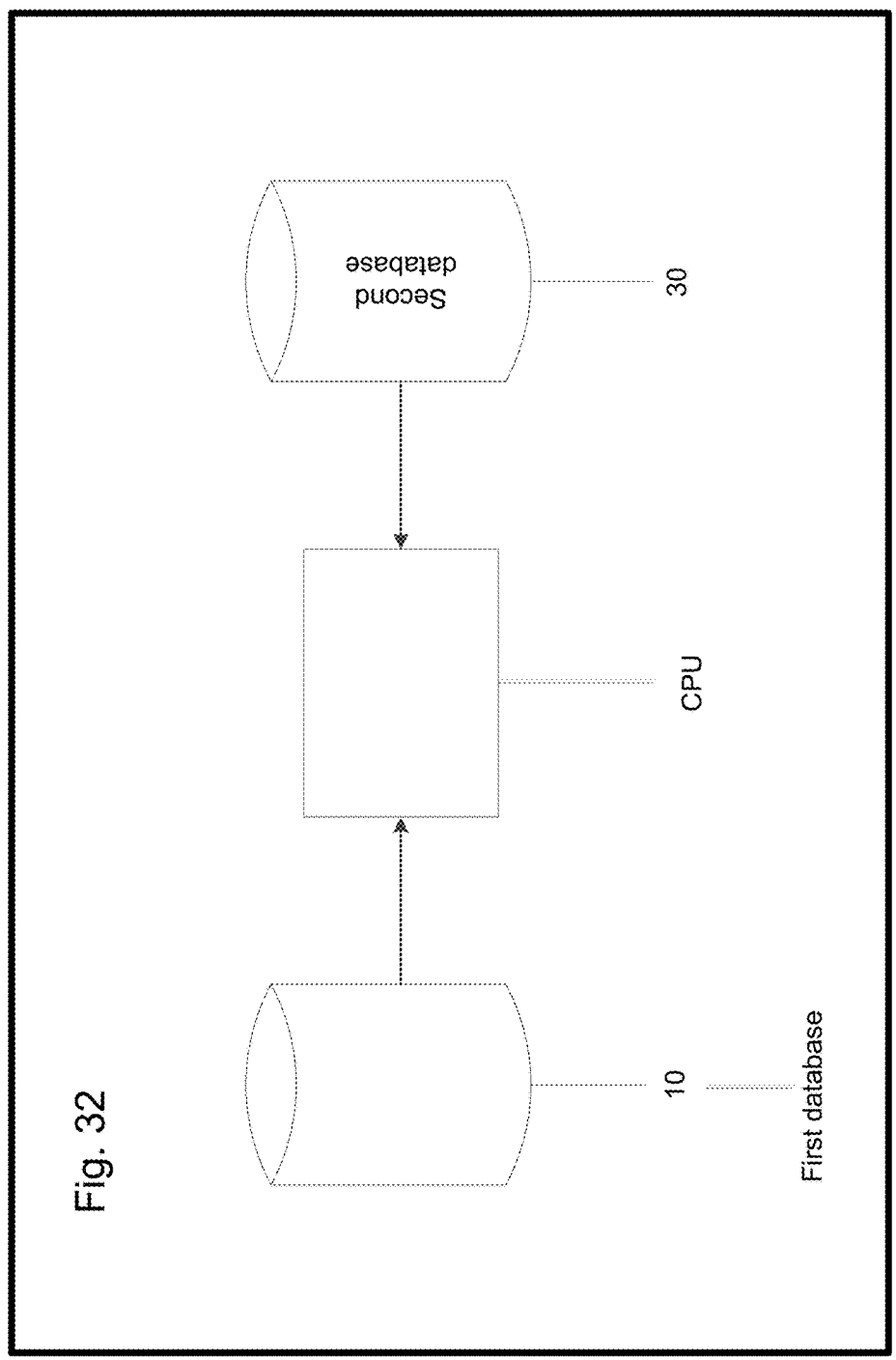

DATA PROCESSING SYSTEMS, DEVICES, AND METHODS FOR CONTENT ANALYSIS

CROSS-REFERENCE TO RELATED APPLICATIONS

This patent application is a continuation of U.S. patent application Ser. No. 14/979,395, filed on Dec. 27, 2015, which is a continuation of U.S. patent application Ser. No. 13/623,251, filed on Sep. 20, 2012, which claims a benefit of priority to U.S. Provisional Patent Application 61/633,523, filed on Feb. 13, 2012 and a benefit of priority to U.S. Provisional Patent Application 61/537,314, filed on Sep. 21, 2011.

All of the above-identified applications are herein fully incorporated by reference for all purposes.

TECHNICAL FIELD

The present disclosure relates to systems, devices and methods for data processing. More particularly, the present disclosure relates to systems, devices and methods for aiding users in content analysis.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, the discussion should be understood that these statements are to be read in this light, and not as admissions of prior art. Likewise, in the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

U.S. Pat. No. 5,774,833 is herein incorporated by reference in its entirety.

U.S. Pat. No. 5,845,288 is herein incorporated by reference in its entirety.

U.S. Pat. No. 8,160,306 is herein incorporated by reference in its entirety.

A typical figure, such as an anatomical figure, an engineering figure, an architectural figure or a patent figure, contains certain elements that indicate by shape and size the nature of the object the figure is intended to depict. Often, included with these figure are alphanumeric reference characters which point to, and are placed next to, the element for which the element corresponds. A user viewing the figure typically has to read through a textual description of the figure, which may be many pages long or in a different location from the figure, to determine what element each alphanumeric reference character refers to, in order to understand the nature of the specific element, as well as the overall figure. This process may be time-consuming, expensive and error-prone.

While certain aspects of conventional technologies have been discussed to facilitate the present disclosure, no technical aspects are disclaimed. The claims may encompass one or more of the conventional technical aspects discussed herein.

BRIEF SUMMARY

The present disclosure addresses at least one of the above problems. However, the present disclosure may prove useful in addressing other problems and deficiencies in a number of technical areas. Therefore, the claims, as recited below, should not necessarily be construed as limited to addressing any of the particular problems or deficiencies discussed herein.

Example embodiments of the present disclosure provide systems, devices and methods for aiding users in content analysis.

An example embodiment of the present disclosure is a computer-implemented method which includes identifying a reference within a figure and an identifier in a text associated with the figure. The reference referring to an element depicted in the figure. The reference corresponding to the identifier. The identifier identifying the element in the text. The method further includes placing the identifier on the figure at a distance from the reference. The identifier visually associated with the reference upon the placing. The placing of the identifier on the figure is irrespective of the distance between the identifier and the reference.

In an example embodiment of the present disclosure the identifier is visually associated with the reference via at least one line displayed on the figure irrespective of the distance between the identifier and the reference.

In an example embodiment of the present disclosure the at least one line is colored for visual distinction.

In an example embodiment of the present disclosure the identifier is visually associated with the reference via a geometric shape displayed on the figure, the shape enclosing the reference and the identifier on the figure.

In an example embodiment of the present disclosure the shape is colored for visual distinction.

In an example embodiment of the present disclosure the identifier is colored on the figure for visual distinction.

In an example embodiment of the present disclosure the computer-implemented method may further provide for printing the figure after the placing of the identifier on the figure, the printed figure including both the identifier and the reference.

In an example embodiment of the present disclosure the placing of the identifier on the figure is user-customizable.

In an example embodiment of the present disclosure the figure and the text are stored in different locations.

In an example embodiment of the present disclosure the computer-implemented method may further provide for, if the text associates an another identifier with the reference, placing the another identifier on the figure adjacent to the identifier without overlapping the identifier.

In an example embodiment of the present disclosure the computer-implemented method may further provide for, receiving the figure from an image capture device before the identifying of the reference within the figure.

In an example embodiment of the present disclosure the computer-implemented method may further provide for, performing a frequency analysis before the placing of the identifier on the figure when the identifier conflicts with an another identifier in the text.

In an example embodiment of the present disclosure the computer-implemented method may further provide for, performing optical character recognition on the text to aid in identifying the identifier.

In an example embodiment of the present disclosure the computer-implemented method may further provide for, creating a bidirectional hyperlink relationship between the reference in the figure and the identifier in the text.

In an example embodiment of the present disclosure the identifier is placed on the figure on an axis of orientation such that a viewer avoids rotating the figure to read the identifier.

In an example embodiment of the present disclosure the computer-implemented method may further provide for, translating the identifier into a language different from the text, the figure including the translated identifier.

In an example embodiment of the present disclosure the identifier and the reference are placed apart from each other in the figure so as to make readability easier while having a proper scale and being compliant with at least one of preselected and customized margins.

In an example embodiment of the present disclosure the computer-implemented method may further provide for, avoiding the placing of the identifier on the figure if the identifier is associated with at least one of length, width, depth, volume, diameter, radius, density and direction.

In an example embodiment of the present disclosure the computer-implemented method may further provide for, repeating the process for a plurality of references within the figure.

An example embodiment of the present disclosure is a computer-implemented method which includes identifying a reference within a figure and an identifier in a text associated with the figure. The reference referring to an element depicted in the figure. The reference corresponding to the identifier. The identifier identifying the element in the text. The method further includes replacing the reference with the identifier on the figure.

In an example embodiment of the present disclosure the computer-implemented method may further provide for, printing the figure after the replacing of the reference with the identifier, the printed figure including the identifier but not the reference.

In an example embodiment of the present disclosure the computer-implemented method may further provide for, if the text associates an another identifier with the reference, placing the another identifier on the figure adjacent to the identifier without overlapping the identifier.

An example embodiment of the present disclosure is a computer-implemented method which includes identifying a reference within a figure and an identifier in a text associated with the figure. The reference referring to an element depicted in the figure. The reference corresponding to the identifier. The identifier identifying the element in the text. The method further includes placing the identifier within the element on the figure.

The present disclosure may be embodied in the form illustrated in the accompanying drawings. Attention is called to the fact, however, that the drawings are illustrative. Variations are contemplated as being part of the disclosure, limited only by the scope of the claims. The above and other features, aspects and advantages of the present disclosure will become better understood to one skilled in the art with reference to the following drawings, detailed description and appended claims.

BRIEF DESCRIPTION OF DRAWINGS

The accompanying drawings, which are incorporated into and form a part of the specification, illustrate example embodiments of the present disclosure. Together with the detailed description, the drawings serve to explain the principles of the present disclosure. The drawings are only for the purpose of illustrating example embodiments of the present disclosure and are not to be construed as necessarily limiting the disclosure. Like numbers can refer to like elements throughout. The above and other aspects, advantages and features of the present disclosure will become better understood to one skilled in the art with regard to the following description, appended claims and accompanying drawings where:

FIG. 1 is a flowchart of an example embodiment of a visual association process according to the present disclosure;

FIG. 2 is a flowchart of another example embodiment of a visual association process according to the present disclosure;

FIG. 3 is a flowchart of yet another example embodiment of a visual association process according to the present disclosure;

FIGS. 4a-4e are diagrams depicting an example embodiment of a process of visual association according to the present disclosure;

FIGS. 5a-5c are diagrams depicting another example embodiment of a process of visual association according to the present disclosure;

DETAILED DESCRIPTION

Figures 4A, 4B:
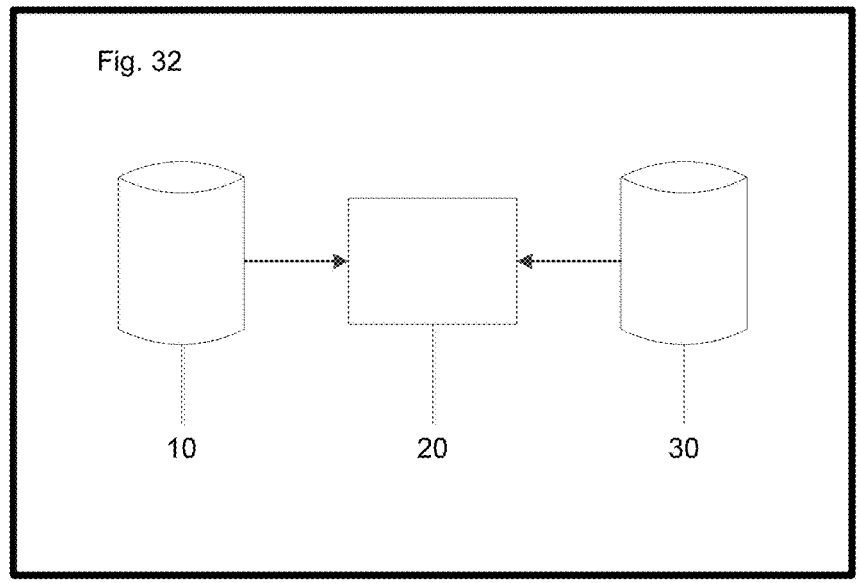

The present disclosure will now be described more fully with reference to the accompanying drawings, in which example embodiments of the disclosure are shown. The disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

According to principles of the present disclosure, any verbs as used herein can imply direct or indirect, full or partial, action or inaction. For example, when an element is referred to as being "on," "connected" or "coupled" to another element, the element can be directly connected or coupled to the other element or intervening elements may be present. In contrast, when an element is referred to as being "directly connected" or "directly coupled" to another element, there are no intervening elements present.

Although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. It will be further understood that the terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Furthermore, relative terms such as "below," "lower," "above," and "upper" may be used herein to describe one element's relationship to another element as illustrated in the accompanying drawings. It will be understood that relative terms are intended to encompass different orientations of the device in addition to the orientation depicted in the accompanying drawings. For example, if the device in the accompanying drawings is turned over, elements described as being on the "lower" side of other elements would then be oriented on "upper" sides of the other elements. Similarly, if the device in one of the figures is turned over, elements described as "below" or "beneath" other elements would then be oriented "above" the other elements. Therefore, the example terms "below" and "lower" can, therefore, encompass both an orientation of above and below.

If any disclosures are incorporated herein by reference and such incorporated disclosures conflict in part or whole with the present disclosure, then to the extent of conflict, and/or broader disclosure, and/or broader definition of terms, the present disclosure controls. If such incorporated disclosures conflict in part or whole with one another, then to the extent of conflict, the later-dated disclosure controls.

FIG. 1 is a flowchart of a visual association method according to the first embodiment of the present disclosure. A process 100 includes blocks 110-120. Process 100 can be performed via a single core processor or a multi-core processor, irrespective of whether the cores are local to each other.

Block 110 includes matching a reference in a figure to an identifier found in a text corresponding to the reference which identifies the element referred to by the reference. The reference in the figure is an alphanumeric character visually referring to an element of the figure. One or more alphanumeric characters may be used, or even non-alphanumeric character references may be used. The reference can be or include symbols as well. An identifier is a name or brief description of the element, which is often textually described. Alternatively, the identifier can even include a plurality of terms, a sentence or even a paragraph.

Typically, the name of the element is disclosed in a description of the figure. For example, in a figure of a patent application, the number 10, which is a reference, can visually refer to an element of the figure, such as a chair. The word "chair" is an identifier that is disclosed in the specification describing the figure of the patent application.

Block 120 includes visually associating in the figure the identifier with the reference. Block 120 can be performed close in time or far apart in time to block 110. One way of visually associating the identifier with the reference is by placing the identifier adjacent to the reference. Alternatively, non-adjacent visual association is possible as well where the identifier refers to the reference irrespective of where the identifier is placed on the figure. Thus, the term "chair" does not have to be adjacent to reference 10. As long as there is a visual association between the term "chair" and reference 10, even if the term "chair" is at a far distance from reference 10, such as, for example, at a corner of the page of the figure, a bottom center or top center of the page of the figure, along a left or right side of the page of the figure, a user can easily identify what the reference 10 is referring to. An example of an adjacent visual association is if the number 10 in the figure refers to a chair, then the word "chair" is placed adjacent to the number 10. Thus, a viewer of the figure, such as a student, a scientist, a hobbyist, an engineer or a patent professional, can easily identify what the reference 10 is referring to without having to peruse the text to find the identifier. Visual associating an identifier with a corresponding reference, even when the two are not adjacent, is described herein.

FIG. 2 is a flowchart of a visual association method according to the first embodiment of the present disclosure. A process 200 includes blocks 210-250.

Block 210 includes searching within a figure for a reference referring to an element of the figure. One way of performing the searching is via computer vision or computer pattern recognition, such as optical character recognition (OCR). The computer searches the figure to locate references, such as alphanumeric and non-alphanumeric characters referring to elements in the figure. In an example embodiment, the searching within the figure for the reference can be within selective geographic regions of the figure. A determination can be made of which selective geographic regions of the figure can be performed automatically, via a preset rule or manually. Alternatively, the figure can be searched via text searching.

Block 220 includes copying the found references into a data structure. One example of a data structure is a list or an array. One example of the found reference is an alphanumeric character, such as the numbers 10 or 20. Block 230 includes searching within a text describing the figure for an identifier corresponding to the reference. Although typically a single reference refers to a single identifier, a possibility exists of another type of correspondence, such as one to many, many to one, or many to many. In such a case, either an error message is generated and displayed, for example, adjacent to the reference. Alternatively, a mode computation/frequency analysis with respect to the reference or the identifier is made, from which it is determined which identifier should be displayed adjacent to a reference, the mode term is flagged and the mode term is used for any subsequent blocks. The flagging can be used later to visually indicate potential imprecision of visual association.

In an example embodiment of the present disclosure, the searching within the text describing the figure can be done within only selective portions of the description as selected by the user, whether a human or a machine/software. A determination of which selective portions of the description can be made automatically via a preset rule or manually.

Block 240 includes copying the found identifier into the data structure. Block 250 includes visually associating in the figure the identifier with the reference.

FIG. 3 is a flowchart of yet another example embodiment of a visual association process according to the present disclosure. A process 300 includes blocks 310-340.

Block 310 includes searching within a text describing a figure for an identifier corresponding to a reference referring to an element within the figure. The text searching can include OCR.

Block 320 includes storing the found identifier in a data structure.

Block 330 includes searching the figure for the reference. One way of searching the figure for the reference is to create a map of locations where in the figure the references are located. Another way of searching the figure for the reference is to search for a presence of just the reference.

Block 340 includes visually associating in the figure the stored identifier with the found reference.

FIGS. 4a-4e are diagrams depicting an example embodiment of a process of visual association according to the present disclosure.

FIG. 4a depicts a patent figure prior to visual association. Although depicted figure is a patent figure, other types of figures, such as architectural, engineering, anatomical, scientific, historical, blueprints, financial or geographical figures, having a textual description of the figures can be used as well. Any type of content can be depicted in the figure. The figures can be any types of diagrams, flowcharts or tree diagrams. The figures can be depicted in any type of views, such as a side view, a perspective view, a top view or bottom views. The figures can be grayscale, white/black or color. The figures can be linked or broken into a plurality of sub-figures depicting one object together. The figures can be drawn by hand, created via a computer or automatically drawn.

FIG. 4b depicts references stored within a data structure, such as a table or an array. The references are obtained from analyzing, via a computer, FIG. 32 as depicted in FIG. 4a. The analyzing can be performed via OCR or other processes as known in the art.

FIG. 4c depicts descriptive text, such as a patent detailed description, describing elements depicted in FIG. 4a. The elements are referenced by the references shown in FIG. 4a and stored within the data structure of FIG. 4b. The descriptive text can be stored in the same file as FIG. 32 as depicted in FIG. 4a or the descriptive text can be stored in a file different file, whether one a same computer or a different computer, from the file containing FIG. 32 as depicted in FIG. 4a.

FIG. 4d depicts the data structure after the descriptive text depicted in FIG. 4c has been parsed and matched accordingly, which can occur in one or more steps/processes. As shown in FIG. 4d, paragraph [0079] has been parsed according to the references stored in the data structure and corresponding identifiers are stored in the data structure. Thus, the data structure stores the identifiers corresponding to the references.

FIG. 4e depicts different ways of visually associating the identifiers with the references.

Identifier "first database" is placed adjacent to reference 10 using a line. The identifier can be in the same font or font size as the rest of the figure, as determined automatically via a computer or manually via a user, or the font or font size can be different, as determined automatically via a computer or manually via a user. The identifier, the reference or the line can be highlighted. The line can also visually associate a plurality of elements. The line can be a straight line or a curved/zigzag line. The line can be without any gaps or the line can be defined via a plurality of closely spaced elements, which can be iconic, symbolic or alphanumeric. The line can be a plurality of aligned or parallel lines. The line can be placed over other elements or avoid placement over other elements, references or identifiers. The computer can be programmed to determine how to properly place the line, such as to place or avoid placing over other elements, references or identifiers. Alternatively, the user can select how to properly place the line or maneuver/drag the line on the figure. The line, the reference or the identifier or any of their portions can be of any color. A user or a computer can automatically select colors. The line can be colored to be visually distinct from the reference, the identifier or the element or other elements, references or identifiers. The line can be hyperlinked, whether uni-directionally or bi-directionally. Upon clicking, the hyperlink can lead to other elements, references and identifiers whether in the present figure, other figures, the text description or other text descriptions. Upon clicking, the hyperlink can allow for popups, hover-overs or slide-outs to disclose information relating to the element, reference or identifier or other elements, references or identifiers.

In an alternative example embodiment, visual association can be performed via placing the identifier adjacent to the reference and placing a shape, such as a rectangle, a box, a circle, an oval, a trapezoid or any other shape, over the reference and the identifier on the figure. The shape can fully or partially encompass the identifier and the reference. The shape delineation, the shape background or foreground, the identifier, the reference or any of their portions can be colored for visual distinction. The shape can be defined via a single line or a plurality of lines, dots, minuses, pluses or other visual elements, including alphanumeric characters. The shape can be a bubble, whether a popup, a hover-over or slide-out. The shape can be hyperlinked. The identifier can be hyperlinked, whether uni-directionally or bi-directionally. Upon clicking, the hyperlink can lead to other elements, references and identifiers whether in the present figure, other figures, the text description or other text descriptions. Upon clicking, the hyperlink can allow for popups, hover-overs or slide-outs to disclose information relating to the element, reference or identifier or other elements, references or identifiers.

Identifier "CPU" replaces the reference 20 as depicted in FIG. 4a. The identifier can be in the same font or font size as the rest of the figure, as determined via automatically via a computer or manually via a user, or the font or font size can be different, as determined via automatically via a computer or manually via a user. The identifier can also visually associate a plurality of elements. The identifier, the reference or the line can be highlighted. The identifier can be placed over other elements or avoid placement over other elements, references or identifiers. The computer can be programmed to determine how to properly place the line, such as to place or avoid placing over other elements, references or identifiers. Alternatively, the user can select how the identifier replaces the reference in the figure. The identifier or any of its portions can be of any color. A user or a computer can automatically select colors. The identifier can be colored to be visually distinct from the reference, the identifier or the element or other elements, references or identifiers. The identifier can be hyperlinked, whether uni-directionally or bi-directionally. Upon clicking, the hyperlink can lead to other elements, references and identifiers whether in the present figure, other figures, the text description or other text descriptions. Upon clicking, the hyperlink can allow for popups, hover-overs or slide-outs to disclose information relating to the element, reference or identifier or other elements, references or identifiers.

Identifier "second database" is placed within the element corresponding to the reference 30. The element, such as its location, size or shape, is automatically determined by a computer using various software algorithms as known in the art. These algorithms can employ computer vision/pattern recognition. The algorithms can refer to element library as publically or privately available. Such library can be stored on the computer or available via the Internet. The algorithms can also determine the element via determining meaning of the identifier as looked up in internal or external library/database. The element can be filled with color for visual distinction. The color can be manually selected by a user or the color can be automatically selected by a computer. A plurality of identifiers, whether identifying same or different element, can be placed within the element and can be visually distinct from other elements, references and identifiers. The identifier, the reference or the line can be highlighted. The identifier can be in the same font or font size as the rest of the figure, as determined via automatically via a computer or manually via a user, or the font or font size can be different, as determined via automatically via a computer or manually via a user. The identifier can also visually associate a plurality of elements. The identifier can be placed over other elements or avoid placement over other elements, references or identifiers. The computer can be programmed to determine how to properly place the line, such as to place or avoid placing over other elements, references or identifiers. Alternatively, the user can select how the identifier replaces the reference in the figure. The identifier, the reference or any of their portions can be of any color. The identifier can be colored to be visually distinct from the reference, the identifier or the element or other elements, references or identifiers. The identifier can be hyperlinked, whether uni-directionally or bi-directionally. Upon clicking, the hyperlink can lead to other elements, references and identifiers whether in the present figure, other figures, the text description or other text descriptions. Upon clicking, the hyperlink can allow for popups, hover-overs or slide-outs to disclose information relating to the element, reference or identifier or other elements, references or identifiers.

Regardless of visual association, a user can select or a computer can automatically decide to shrink or compact the figure so as to allow for placement of the identifier or a plurality of identifier so as to allow for readability of the identifier or the plurality of the identifiers. For example, font sizes can be automatically increased.

Any method of visual association can allow for any portion of any element, identifier, reference, line, shape, character, symbol, tag, hyperlink or any other way of visual association to be of any color or any color for visual distinction. Any of these types of visual association can be automatically or manually combined in any way and any of these types of visual association can be automatically or manually be made visually distinct from other references or identifiers. For example, a computer can automatically determine how to visually associate and such determination can mix and match different types of visual associations. Such mix and match can depend on the context or content of the figure, such as whether to write over or avoid writing over other elements, references or identifiers. One element can be visually associated with all or less than all ways of visually associating.

FIGS. 5*a*-5*c* are diagrams depicting another example embodiment of a process of visual association according to the present disclosure.

FIG. 5*a* depicts descriptive text, such as a patent detailed description, describing various elements in a corresponding figure, in which the elements are referenced by references and named via identifiers.

FIG. 5*b* depicts a data structure after the descriptive text depicted in FIG. 5*a* has been parsed, matched and stored in the data structure. As shown in FIG. 5*b*, paragraph [0079] has been parsed and matched by the references and corresponding identifiers and stored in the data structure. Thus, the data structure stores the identifiers corresponding to the references.

FIG. 5*c* depicts different ways of visually associating the identifiers with the references. Identifier "first database" is adjacent to reference 10. Identifier "CPU" replaces the reference 20. Identifier "second database" is placed within the element corresponding to the reference 30.

Any of these types of visual association can be automatically or manually combined in any way, even with FIGS. 4*a*-4*e*, and any of these types of visual association can be automatically or manually be made visually distinct from other references or identifiers.

Figure 6A:
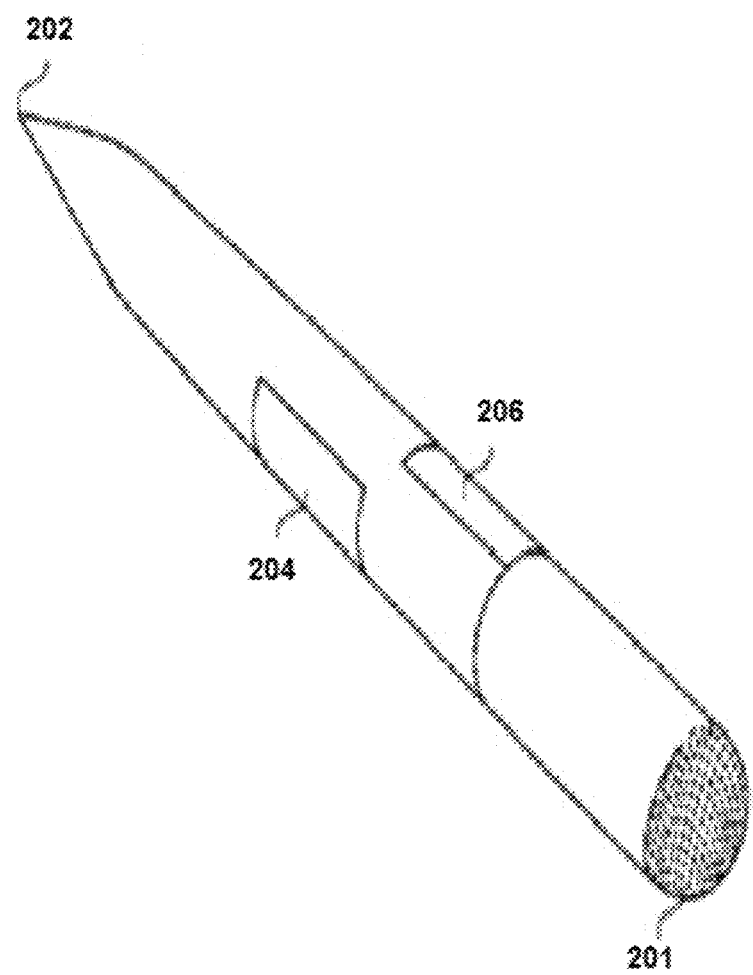
FIGS. 6a-6b are diagrams of an example embodiment of a figure before and after visual association according to the present disclosure.
Figure 6B:
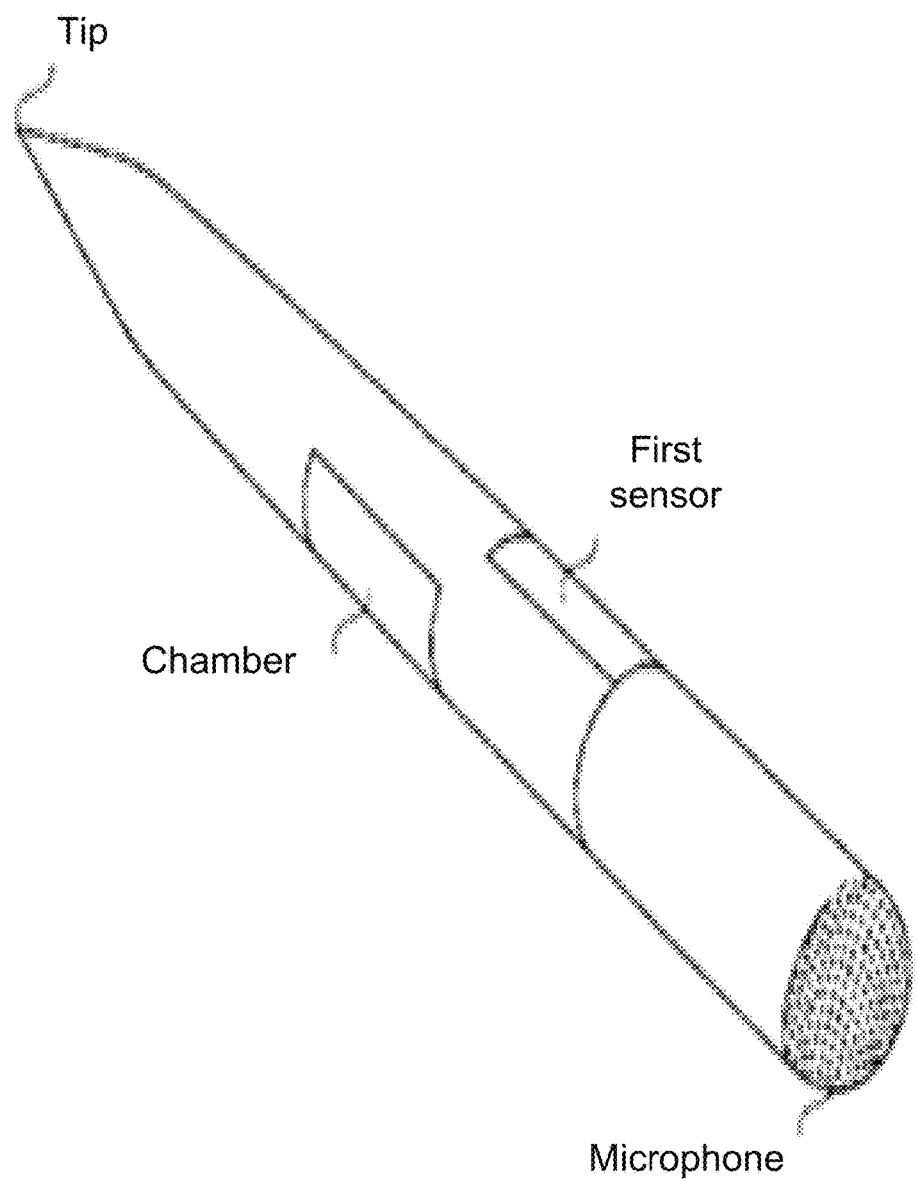

FIGS. 6*a*-6*b* are diagrams of an example embodiment of a figure before and after visual association according to the present disclosure. FIG. 6*a* depicts a microphone pen before visual association. FIG. 6*b* depicts the microphone pen after visual association. Each identifier as depicted in FIG. 6*b* can be visually associated with a reference as depicted in FIG. 6*a* that the identifier replaced. For example, as shown in FIG. 6*b*, the identifier "chamber" can be visually associated with the reference 204 using any visual association methods as described herein.

Figure 7:
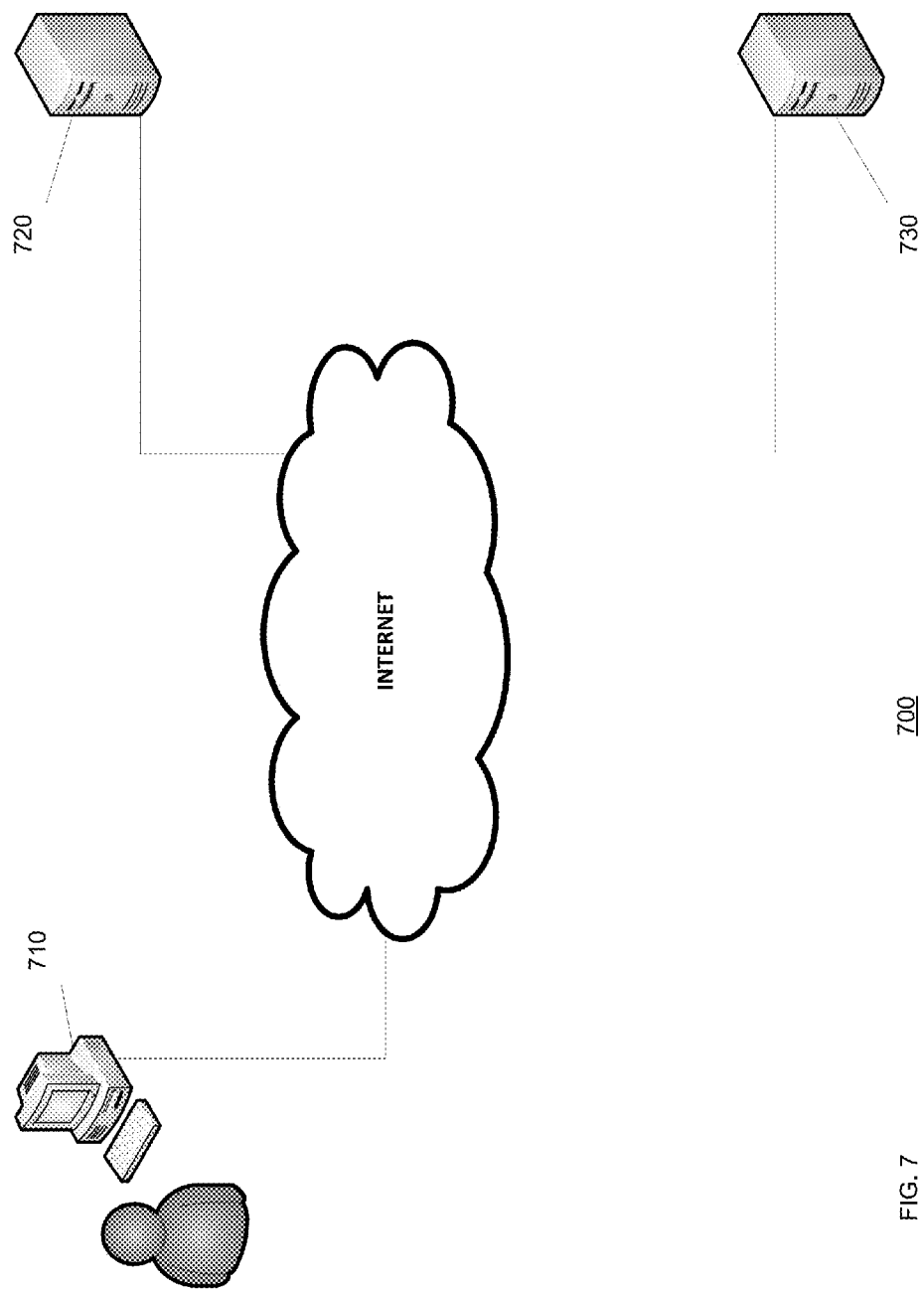
FIG. 7 is a network diagram of an example embodiment of a network within which visual association is performed according to the present disclosure.

FIG. 7 is a network diagram of an example embodiment of a network within which visual association is performed according to the present disclosure. A network 700 includes a user computer 710 connected to a network, such as the Internet. A first server 720 and a second server 730 are accessible via the network.

Any one or all or computer 710 and servers 720 can be any type of a computer, such as a desktop, a laptop, a mainframe, a cloud-computing system, a smartphone, a tablet computer or a workstation.

Visual association, as described herein, can be performed locally on user computer 710 by a program installed on a hard disk or can be run as a module within other software, such as a word processing application, a browser or a mobile app. Alternatively, visual association can be performed via a website or a web portal. Alternatively, visual association can be performed by first server 720 wherein a user of user computer 710 accesses first server 720, performs the visual association on a selected figure or a file and then downloads the visually associated figure or the file. More alternatively, visual association can be performed by first server 720 on a set files which are then stored in a database on second server 730. Then, a user of user computer 710 accesses second server 730 to download a selected visually associated figure or a visually associated file.

The visual associating may include printing the visually associated file or a figure of the file or a section of the figure. When printing multiple pages with the visually associated figures on the same sheet, the visual association of one page avoids interfering with visual association of other sheets. Also, the visually associating can be performed according to a view of the figures, wherein the view is a portrait view or a landscape view.

In an example embodiment, the visually associating is performed according to a preset rule, such as placing the identifier a certain distance from the reference or visually associating in a way such that all identifiers fit on a single screen or a page. The distance can be manually selected. Alternatively, the distance can be automatically selected by a computer upon analysis of a section of the figure or the figure to determine optimal placement and/or method of visual association.

In an example embodiment, in a computer network environment, one user can perform a visual association process, store and allow access to the visually associated file (old one or create new one) to other users. Thus, other users can avoid repetition of the visual association process in order to improve efficiency.

In an example embodiment, upon matching of the references and identifiers, the method can further display or be used for data mining, such as determining which elements have missing references or identifiers.

In an example embodiment, the visual associating can be performed on a section of a figure, a single FIGURE, multiple figures within a file, a single FIGURE within each of multiple files, multiple figures in multiple files, or via a directory within memory storing a plurality of files with figures.

Even though the figure and the description can be stored in one computer file, the figure and the description can be stored in multiple computer files, in one or multiple computers, and/or in one or multiple distinct locales. Further, the figure can be obtained from an image capture device, such as a scanner, and matched with the description. Likewise, the description can be automatically or manually obtained from a description database, such as a patent text database or a digital textbook, and then automatically or manually matched with the figure. Also, although a single FIGURE and a single description are described, multiple figures can be one described as one figure and one figure can be described in multiple descriptions and if identifiers conflict, then a frequency analysis can be used or a preset rule can be invoked. Moreover, if a description of the figure is an image, then text within the image can be recognized via OCR technology and then parsed as described herein.

In an example embodiment, in the figure, by selecting the reference, the element or a portion of the element itself, such as by clicking on the element/reference or by hovering the mouse over the element/reference, the user may cause to be dynamically displayed, such as adjacent to the reference or element or visually associated with the reference/element, an identifier associated with a respective reference. Since each element or a portion thereof is associated with a different reference, moving the mouse from one element to another enables the reference associated with the another element to be displayed as described herein.

In an example embodiment, in a patent application or a patent grant stored in a computer accessible file, if the user selects at least one word in a claim and that selected word is shown in a figure, as determined by the parsing and identification from the description and location via the reference in the figure, then the element in the figure and/or the numeral corresponding to the element will be highlighted or shown in a new window or bubble or any other type of data display that inform the user of the location of the at least one word in the claim. This allows the user to quickly find the associated figure or element in the figure for further understanding of the text. Similarly, the user can do the reverse, whereby the user selects an element of the figure, which highlights a corresponding associated text in the description or the concept in a claim, such as a noun, by showing in a new window or bubble or any other type of data display that inform the user of the location of the at identifier.

In an example embodiment, in a patent application or a patent grant stored in a computer accessible file, after parsing and visually associating, the data can be viewed via calendar views, such as for a continuation-in-part patent application where a date or dates of filing or priority can be associated with references/identifiers to identify newly added subject matter, alerts, such as via conflicting references/identifiers, information bubbles associated with references/identifiers, color variances for references/identifiers, such as user-customizable color palettes for each or all or any as desired references/identifiers.

In an example embodiment, in a figure, after parsing and corresponding references to identifiers or vice versa, a listing of references and corresponding identifiers can be displayed on a side of the figure or corner of the page or anywhere else away from the actual figure in a form of a table or any other representation of data that allows the user to easily identify which identifiers the references refer to. This can be done simultaneously with or alternatively to the visual association as described herein.

In an example embodiment, a figure or a plurality of figures can be adjusted to have a same or similar axis of orientation to allow for convenient reading of the figure. Likewise, in one or more figures, references or identifiers can be placed or adjusted or rotated or moved to have a similar axis of orientation so as to be viewed without rotating the figure or the figures. Fonts or font sizes can be automatically adjusted as well.

In an example embodiment, after parsing and matching the identifiers and the references on at least one figure, the user can click the reference/identifier to jump or lead to a first instance of such reference/identifier in the description or the claims or the figure.

In an example embodiment, after parsing and matching the identifiers and the references on at least one figure, upon clicking/hovering over/selecting the reference, a scrollable/expandable/window with a description of at least a portion of the figure or a specific description of the element corresponding to the selected reference is shown.

In an example embodiment, whether before, during or after parsing and matching the identifiers and the references on at least one figure or a section of the figure, at least one of the references or identifiers in the figure can be translated into any human language. The language can be as selected from a menu provided to a user or automatically detected via a computer, whether local or remote, and then facilitate translation. The translation can occur via using online translation engine, such as Google Translate, or locally, via locally stored translation library or using a computer's operating system. The translation can occur before, during or after the placing of the identifier on the figure.

In an example embodiment, in a patent application or a patent grant stored in a computer accessible file, manually select a plurality of words from at least one independent claim or automatically parse at least one independent claim into a plurality of nouns and match via searching the plurality of words or the parsed nouns to at least one visually associated figure that contains the plurality of words or the parsed nouns in another patent application or another patent grant stored in another computer accessible file on a network source, such as a database hosted on a server. Also, any other visually associated figures in other literature or websites or applications can be matched to as well. Thus, this method can be used to identify an anticipation rejection compliant with at least US patent law.

In an example embodiment, in a patent application or a patent grant stored in a computer accessible file, manually select a plurality of words from at least one independent claim or automatically parse at least one independent claim into a plurality of nouns and match via searching the plurality of words or the parsed nouns to at least one figure in the same file. Then, at least temporarily hiding, such as via placing white space or color contrasting or putting an X through, the references or the identifiers in the figure that are not associated or correspond to the nouns or the words. Thus, only references having identifiers associated with the claim are shown in the figure.

In an example embodiment, references and identifiers are placed apart from each other in the figure so as to make readability easier while being compliant with preselected or customized margins and having a proper scale.

In an example embodiment, some measurements, such as length, width, depth, volume, diameter, radius, density, direction, can remain unlabeled. Such measurements can be detected by presence of various signs, such as arrows on the figure or when the text identifies the identifiers as such.

In an example embodiment, via the disclosure the user can determine whether a claimed element is in the specification or the figure.

In an example embodiment, an examiner can put on 3d glasses, such as made by Nvidia, and perform any disclosures provided herein without running visual association process on the actual file having references and identifiers. Rather, the disclosure as described herein is performed by the software for the glasses.

In an example embodiment, the disclosed technology can ensure a figure's compliance with 37 CFR 1.83 or 1.84 and display warnings if the figure is not compliant. For example, if the figure has improper margins, fonts, font sizes, colors, the disclosed technology can notify non-compliance with 37 CFR 1.83 or 1.84.

In an example embodiment, the disclosure can be performed on one file, a plurality of files or portions retrieved from a plurality of files. Also, the disclosure can be performed via one or a plurality of computers or servers. Also, the files can be stores on one computer or a plurality of computers in any way. Also, the disclosure can be performed locally or remotely or on one computer or a software app or over a computer network, such as the Internet.

In an example embodiment, visual association can be performed on a video showing a plurality of images or figures where the video is associated with text mentioning the elements as shown in the video. The video can have audio reading the text.

In an example embodiment, any portion of any embodiments or permutations thereof, as described herein, can be combined in any way according to the principles of the present disclosure.

Figure 8A:
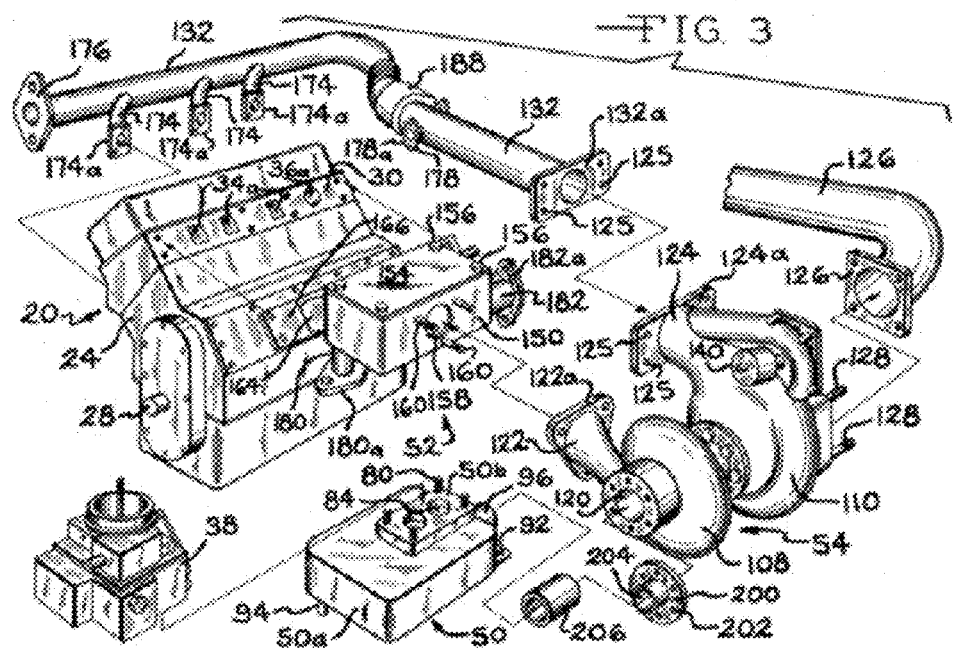
FIGS. 8a-8b are diagrams of an example embodiment of a figure before and after visual association according to the present disclosure.
Figure 8B:
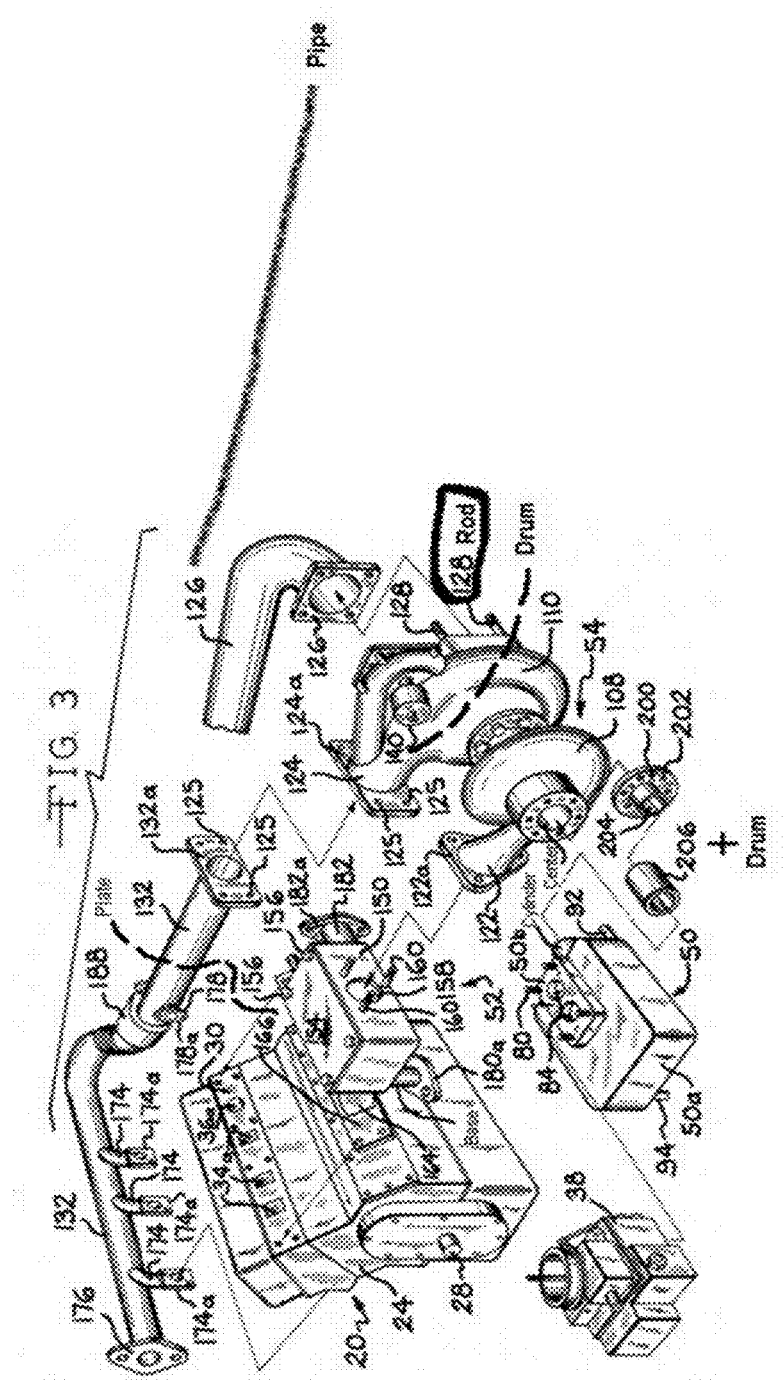

FIGS. 8a-8b are diagrams of an example embodiment of visual association a figure before and after visual association according to the present disclosure. Any of the methods of visual association can be combined in any way. For example, although one figure can be visually associated in one method of visual association, the one figure can include multiple methods of visual association. When a plurality of figures is desired to be visually associated, then all or less than all figures can be associated in a same or different ways. Any elements, references, identifiers, methods of visual associations or portions thereof can be hyperlinked. When a computer decides which visual method to employ, then the computer uses algorithms which look for presence of empty space, such as white space, near the reference to place the identifier, possibility of reference/visual association placement over other elements, references, identifiers or methods of visual association, size of the figure or portion of the figure, screen space, font size, colors, speed/memory of computer or web connection, user confusion (as defined by a user or programmed in advance) and other similar concerns.

Note that reference 180 within the element has been replaced with identifier "base" within the element corresponding to reference 180. The identifier can be colored for visual distinction or be same color as at least a portion of the figure. A user can select or a computer can automatically determine as to how to most optimally visually associate. With the reference 180, the computer automatically chose to write within the element.

Note that references 96 and 120 outside of their elements have been replaced with identifiers "cylinder" and "center" outside of their elements corresponding to references 96 and 120. Alternatively, such replacement could be done within the elements, like done regarding reference 180. The identifiers can be colored for visual distinction or be same color as at least a portion of the figure. A user can select or a computer can automatically determine as to how to most optimally visually associate. With the references 96 and 120, the computer automatically chose to replace the reference.

Note that reference 206 has been visually associated via an alphanumeric character corresponding to a plus symbol. Alternatively, non-alphanumeric character, such as a symbol or an icon, can also be used. The character or the reference can be can be colored for visual distinction or be same color as at least a portion of the figure. A user can select or a computer can automatically determine as to how to most optimally visually associate. With the reference 206, the computer automatically chose to write within the element.

Note that reference 140 has been visually associated via a line defined via a broken line visually associating over at least one element. The line indicates the identifier "drum" corresponding to the reference 140. The line, the reference or identifier can be can be colored for visual distinction or be same color as at least a portion of the figure. A user can select or a computer can automatically determine as to how to most optimally visually associate. With the reference 140, the computer automatically chose to use a broken line method over the at least one element.

Note that reference 128 has been visually associated via an identifier "rod" placed near the reference 128 and a shape placed around the reference 128 and the identifier "rod." The shape can be a rectangle, a box, a circle, an oval, a trapezoid or any other shape. The shape can fully or partially encompass the identifier and the reference. The shape delineation, the shape background or foreground, the identifier or the reference can be colored for visual distinction. The shape can be defined via a single line or a plurality of lines, dots, minuses, pluses or other visual elements, including alphanumeric characters. The shape can be a bubble, whether a popup, a hover-over or slide-out. The shape can be hyperlinked. The identifier can be hyperlinked, whether unidirectionally or bi-directionally. Upon clicking, the hyperlink can lead to other elements, references and identifiers whether in the present figure, other figures, the text description or other text descriptions. Upon clicking, the hyperlink can allow for popups, hover-overs or slide-outs to disclose information relating to the element, reference or identifier or other elements, references or identifiers. A user can select or a computer can automatically determine as to how to most optimally visually associate. With the reference 128, the computer automatically chose to the shaping method.

Note that reference 126 has been visually associated with identifier "pipe" via an unbroken line in a non-adjacent manner i.e. irrespective of the distance between the reference 126 and the identifier "pipe." The element, the line, the reference, the identifier or any portions thereof can be colored for visual distinction or be same color as at least a portion of the figure. A user can select or a computer can automatically determine as to how to most optimally visually associate. With the reference 126, the computer automatically chose to the unbroken line method.

Note that reference 166 has been visually associated with identifier "plate" via a broken line in a non-adjacent manner i.e. irrespective of the distance between the reference 126 and the identifier "pipe." The element, the line, the reference, the identifier or any portions thereof can be colored for visual distinction or be same color as at least a portion of the figure. A user can select or a computer can automatically determine as to how to most optimally visually associate. With the reference 166, the computer automatically chose to the broken line method to associate over other elements and association over other references, identifiers, methods of visual association or any portions thereof can also be performed.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. Other types of programming languages include HTML5, Flash and other similar languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flow diagrams depicted herein are just one example. There may be many variations to this diagram or the steps (or operations) described therein without departing from the spirit of the disclosure. For instance, the steps may be performed in a differing order or steps may be added, deleted or modified. All of these variations are considered a part of the claimed disclosure.

While the preferred embodiment to the disclosure had been described, it will be understood that those skilled in the art, both now and in the future, may make various improvements and enhancements which fall within the scope of the claims which follow. These claims should be construed to maintain the proper protection for the disclosure first described.

The description of the present disclosure has been presented for purposes of illustration and description, but is not intended to be exhaustive or limited to the disclosure in the form disclosed. Many modifications and variations in techniques and structures will be apparent to those of ordinary skill in the art without departing from the scope and spirit of the disclosure as set forth in the claims that follow. Accordingly, such modifications and variations are contemplated as being a part of the present disclosure. The scope of the present disclosure is defined by the claims, which includes known equivalents and unforeseeable equivalents at the time of filing of this application.

What is claimed is:

1. A method comprising:
    accessing, via a processor, a first drawing comprising a first blueprint content containing an element and a callout, wherein the element is associated with the callout, wherein the first drawing is stored in a directory;
    recognizing, via the processor, the callout while the first drawing is stored in the directory;
    identifying, via the processor, an alphanumeric content in a second drawing based on the callout being recognized, wherein the second drawing comprises a second blueprint content, wherein the second blueprint content relates to the first blueprint content, wherein the second drawing is stored in the directory; and
    hyperlinking, via the processor, the callout while the first drawing and the second drawing are stored in the directory such that at least one of a popup, a hover-over, or a slide out is displayed when the callout is activated, wherein the at least one of the popup, the hover-over, or the slide out comprises an informational content that is hyperlinked, wherein the informational content leads to the second drawing based on the alphanumeric content when the informational content is activated.

2. The method of claim 1, wherein the processor is of a server, wherein the processor of the server is programmed to present the second drawing to a browser of a client based on the informational content being activated via the browser.

3. The method of claim 1, wherein the callout includes a shape that is closed, wherein the alphanumeric content is a second alphanumeric content, wherein the callout includes a first alphanumeric content, wherein the second alphanumeric content is identified based on matching the first alphanumeric content.

4. The method of claim 2, wherein the shape is color-filled before the callout is activated such that the shape is visually distinct relative to the first blueprint content.

5. The method of claim 1, wherein the second blueprint content includes the alphanumeric content.

6. The method of claim 1, wherein the second blueprint content is a sub-content of the first blueprint content.

7. The method of claim 1, wherein the alphanumeric content is a second alphanumeric content, wherein the callout includes a first alphanumeric content, wherein the second alphanumeric content is identified in the second drawing based on forming, via the processor, a copy of the first alphanumeric content, searching, via the processor, the second drawing for the copy, locating, via the processor, a match between the second alphanumeric content and the copy.

8. The method of claim 7, wherein the match is a partial match.

9. The method of claim 7, wherein the match is a full match.

10. The method of claim 1, wherein the first drawing is not scanned.

11. The method of claim 1, wherein the second drawing is not scanned.

12. The method of claim 1, wherein the alphanumeric content is a second alphanumeric content, wherein the callout includes a first alphanumeric content, wherein the processor is programmed to present a closed shape about the first alphanumeric content after the callout is hyperlinked.

13. The method of claim 12, wherein the closed shape is colored internally such that the closed shape is visually distinct relative to the first blueprint content.

14. The method of claim 1, wherein the popup is displayed when the callout is activated.

15. The method of claim 1, wherein the hover-over is displayed when the callout is activated.

16. The method of claim 1, wherein the slide out is displayed when the callout is activated.

17. The method of claim 1, wherein the informational content includes a text.

18. The method of claim 1, wherein the informational content includes an image.

19. A method comprising:
    receiving, via a server, a first page from a client, wherein the first page includes a first blueprint content and a first region, wherein the first region is external to the first blueprint content, wherein the first region contains a first alphanumeric character;

storing, via the server, the first page in a directory;

receiving, via the server, an input from the client after the first page is stored in the directory, wherein the input selects the first region;

performing, via the server, a first OCR technique on the first region based on the input such that the first alphanumeric character is recognized while the first page is stored in the directory;

receiving, via the server, a second page from the client, wherein the second page includes a second blueprint content and a second region, wherein the second region is external to the second blueprint content, wherein the second region contains a second alphanumeric character;

storing, via the server, the second page in the directory;

performing, via the server, a second OCR technique on the second region based on the input such that the second alphanumeric character is recognized while the second page is stored in the directory; and presenting, via the server, the first alphanumeric character and the second alphanumeric character to the client after the second OCR technique is performed while the first drawing is stored in the directory and the second drawing is stored in the directory.

20. The method of claim 19, wherein the first page is included in a PDF file.

* * * * *